(12) United States Patent
Iyoda et al.

(10) Patent No.: US 8,387,013 B2
(45) Date of Patent: *Feb. 26, 2013

(54) METHOD, APPARATUS, AND COMPUTER PRODUCT FOR MANAGING OPERATION

(75) Inventors: Satoshi Iyoda, Kawasaki (JP);
Yoshinobu Hibi, Kawasaki (JP);
Masayuki Naitou, Kawasaki (JP);
Shigehiro Yoshikawa, Kawasaki (JP);
Toshihiro Abe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 954 days.

This patent is subject to a terminal disclaimer.

(21) Appl. No.: 11/787,758

(22) Filed: Apr. 17, 2007

(65) Prior Publication Data

US 2007/0234351 A1   Oct. 4, 2007

Related U.S. Application Data

(63) Continuation of application No. PCT/JP2004/015382, filed on Oct. 18, 2004.

(51) Int. Cl.
*G06F 9/44* (2006.01)
*G06F 9/445* (2006.01)

(52) U.S. Cl. .................. 717/122; 717/121; 717/176

(58) Field of Classification Search .................. None
See application file for complete search history.

(56) References Cited

U.S. PATENT DOCUMENTS

| | | | |
|---|---|---|---|
| 5,400,325 A | 3/1995 | Chatwani et al. | |
| 5,812,751 A | 9/1998 | Ekrot et al. | |
| 5,996,086 A | 11/1999 | Delaney et al. | |
| 6,163,856 A | 12/2000 | Dion et al. | |
| 6,453,426 B1 | 9/2002 | Gamache et al. | |
| 6,535,998 B1 | 3/2003 | Cabrera et al. | |
| 6,597,956 B1 | 7/2003 | Aziz et al. | |
| 7,093,124 B2 | 8/2006 | Girard | |
| 7,124,322 B1 | 10/2006 | Backman | |
| 7,287,186 B2 | 10/2007 | McCrory et al. | |
| 7,305,452 B2 | 12/2007 | Sakatani | |
| 7,325,156 B1 * | 1/2008 | Schloss et al. | 714/6.3 |
| 7,363,514 B1 | 4/2008 | Behren | |
| 7,478,275 B1 | 1/2009 | Deolasee et al. | |
| 7,574,620 B2 | 8/2009 | Hartung | |
| 7,716,373 B2 * | 5/2010 | Hamanaka et al. | 709/246 |

(Continued)

FOREIGN PATENT DOCUMENTS

| | | |
|---|---|---|
| JP | 63-104166 | 5/1988 |
| JP | 05-160876 | 6/1993 |

(Continued)

OTHER PUBLICATIONS

Fujitsu Ltd., "Systemwalker Resource Coordinator Goshokai", [online], Nov. 2004, Fujitsu Ltd., [retrieval date Jan. 7, 2005], Internet <URL:http://systemwalker.fujitsu.com/jp/rc/catalog/pdf/rc_pdf>.

(Continued)

*Primary Examiner* — Chuck Kendall
(74) *Attorney, Agent, or Firm* — Greer, Burns & Crain, Ltd.

(57) ABSTRACT

A system resource manager of a site management server registers a server domain as a group of servers having a uniform physical wire connection. A software RM of the site management server and a software sub RM of a domain management server install, in cooperation with each other, a software used by a server that belongs to a registered server domain in a storage connected via a SAN, and causes the server to use installed software.

15 Claims, 43 Drawing Sheets

U.S. PATENT DOCUMENTS

| | | | |
|---|---|---|---|
| 7,797,288 B2 | 9/2010 | Zhang et al. | |
| 7,822,810 B2 * | 10/2010 | Dayal et al. | 709/204 |
| 7,971,089 B2 * | 6/2011 | Yoshikawa et al. | 714/13 |
| 2002/0059263 A1 | 5/2002 | Shima et al. | |
| 2002/0075321 A1 | 6/2002 | Sakatani | |
| 2002/0091854 A1 | 7/2002 | Smith | |
| 2002/0120744 A1 | 8/2002 | Chellis et al. | |
| 2002/0184484 A1 | 12/2002 | Abboud et al. | |
| 2003/0005096 A1 | 1/2003 | Paul et al. | |
| 2003/0046531 A1 | 3/2003 | Hiramoto | |
| 2003/0097422 A1 | 5/2003 | Richards et al. | |
| 2003/0126202 A1 | 7/2003 | Watt | |
| 2003/0126242 A1 | 7/2003 | Chang | |
| 2003/0130832 A1 | 7/2003 | Schulter et al. | |
| 2003/0177239 A1 | 9/2003 | Shinohara et al. | |
| 2004/0047354 A1 | 3/2004 | Slater et al. | |
| 2004/0054780 A1 | 3/2004 | Romero | |
| 2004/0068667 A1 | 4/2004 | Kumhyr et al. | |
| 2004/0107272 A1 | 6/2004 | Manukyan | |
| 2004/0107273 A1 | 6/2004 | Biran et al. | |
| 2004/0117438 A1 | 6/2004 | Considine et al. | |
| 2004/0243796 A1 | 12/2004 | Keohane et al. | |
| 2005/0015471 A1 | 1/2005 | Zhang et al. | |
| 2005/0050356 A1 | 3/2005 | King et al. | |
| 2005/0125212 A1 | 6/2005 | Hunt et al. | |
| 2006/0047852 A1 | 3/2006 | Shah et al. | |
| 2006/0143498 A1 | 6/2006 | Hatasaki et al. | |
| 2007/0067613 A1 | 3/2007 | Mizoguchi | |
| 2007/0174658 A1 | 7/2007 | Takamoto et al. | |
| 2007/0233872 A1 * | 10/2007 | Yoshikawa et al. | 709/226 |
| 2007/0234116 A1 | 10/2007 | Yoshikawa et al. | |
| 2007/0283422 A1 * | 12/2007 | Iyoda et al. | 726/4 |
| 2008/0133963 A1 | 6/2008 | Katano et al. | |

FOREIGN PATENT DOCUMENTS

| | | |
|---|---|---|
| JP | 07-121395 | 5/1995 |
| JP | 09-016521 | 1/1997 |
| JP | 09-297692 | 11/1997 |
| JP | 2000-099359 | 4/2000 |
| JP | 2000-354062 | 12/2000 |
| JP | 2002-007174 | 1/2002 |
| JP | 2002-278769 | 9/2002 |
| JP | 2003-022190 | 1/2003 |
| JP | 2003-067351 | 3/2003 |
| JP | 2003-067352 | 3/2003 |
| JP | 2004-508616 | 3/2004 |
| JP | 2004-110791 | 4/2004 |
| JP | 2004-355624 | 12/2004 |
| WO | WO 01/80003 | 10/2001 |
| WO | 02/03203 A2 | 1/2002 |
| WO | WO 02/07037 | 1/2002 |

OTHER PUBLICATIONS

Fujitsu Ltd., "Resource Seigyo Catalog", [online], Nov. 2004, Fujitsu Ltd., [retrieval date Jan. 7, 2005], Internet <URL:http://systemwalker.fujitsu.com/jp/rc/catalog/pdf/resource.pdf>.

Fujitsu Ltd., "Systemwalker Resource Coordinator Kino Goshokai", [online], Nov. 2004, Fujitsu Ltd., [retrieval date Jan. 7, 2005], Internet <URL:http://systemwalkerfujitsu.com/jp/rc/catalog/pdf/rc_pdf>.

Akira Tsuneya; "New Management Technologies for Blade Servers;" Fujitsu Sci.Tech. Journal [Online] vol. 40, No. 1; Jun. 2004, pp. 141-150; URL:http://www.fujitsu.com/downloads/MAG/vol40-1/paper18.pdf> [retrieved Mar. 19, 2009].

Intel: "Preboot Execution Environment (PXE) Specification, Version 2.1"; Internet Citation, [Online]; Sep. 29, 1999; URL:http://www.pix.net/software/pxeboot/archive/pxespec.pdf> [retrieved on Oct. 11, 2006].

Hirao et al.; "Resource Management;" Fujitsu Sci. Tech. Journal [Online] vol. 40, No. 1; Jun. 2004; pp. 123-132; URL:http://www.fujitsu.com/downloads/MAG/vol.40-1/paper16.pdf> [retrieved Mar. 19, 2009].

Yoshimura et al., "Server Allocation Policy for Improving Response on Web Access Peaks," The Transactions of the Institute of Electronics Information and Communication Engineers, IEICE, Sep. 1, 2002, vol. J85-D-I, No. 9, pp. 866-876 (JP-N6-08-042538).

Extended European Search Report issued by the European Patent Office for Application No. 10159527.0-224, mailed Jun. 28, 2010.

Japanese Office Action mailed Jun. 22, 2010 for Application No. JP 2006-542126 (with partial English language translation).

Japanese Office Action mailed Jan. 24, 2012 for Application No. JP 2010-255363 (with partial English language translation).

Japanese Office Action mailed Sep. 14, 2010 for Application No. JP 2006-542128 (with partial English language translation).

\* cited by examiner

FIG.4

SITE DATA
300

| SITE NAME | SITE MANAGEMENT SERVER NAME | DOMAIN MANAGEMENT SERVER NAME |
|---|---|---|
| DataCenter | SiteAdminSvrA | DomainAdminSvrA<br>DomainAdminSvrB |

FIG.5

DOMAIN MANAGEMENT SERVER DATA
310

| DOMAIN MANAGEMENT SERVER NAME | MANAGEMENT SUBNET NAME |
|---|---|
| DomainAdminSvrA | AdminSubnetA<br>AdminSubnetB |
| DomainAdminSvrB | Admin SubnetC |

FIG.6

MANAGEMENT SUBNET DATA
320

| MANAGEMENT SUBNET NAME | NETWORK ADDRESS | NETMASK | DEFAULT GATEWAY |
|---|---|---|---|
| AdminSubnetA | 192.168.1.0 | 255.255.255.0 | 192.168.1.1 |
| AdminSubnetB | 192.168.2.0 | 255.255.255.0 | 192.168.2.1 |
| AdminSubnetC | 192.168.3.0 | 255.255.255.0 | 192.168.3.1 |

FIG.7

MIDDLEWARE COOPERATION IF DATA 330

| MIDDLEWARE NAME | TARGET EVENT | TIMING | LOCATION | EXECUTION COMMAND |
|---|---|---|---|---|
| MW_A | SERVER GROUP CREATION | BEFORE AFTER | MANAGER MANAGER | - issvgrp add |
| | SERVER GROUP DELETE | BEFORE AFTER | MANAGER MANAGER | issvgrp del - |
| | SERVER ADDITION | BEFORE AFTER | MANAGER MANAGER AGENT | isserver check isserver add - |
| | SERVER DELETE | BEFORE AFTER | MANAGER AGENT MANAGER | isserver del - - |
| | SOFTWARE IMAGE EXTRACTION | BEFORE AFTER | MANAGER AGENT MANAGER AGENT | - isproc stop - isproc start |
| | SOFTWARE IMAGE DISTRIBUTION | BEFORE AFTER | MANAGER MANAGER AGENT | isserver check isserver update isproc start |

FIG.8

SERVER DOMAIN DATA 340

| SERVER DOMAIN NAME | SERVER ARCHITECTURE NAME | MANAGEMENT SUBNET NAME |
|---|---|---|
| Web_domain | ARC_A | AdminSubnetA |
| AP_domain | ARC_B | AdminSubnetB |
| DB_domain | ARC_C | AdminSubnetC |

FIG.9

POOL GROUP DATA
350

| POOL GROUP NAME | TYPE | SERVER DOMAIN NAME |
|---|---|---|
| Web_domain.pool | SERVER GROUP SHARING | Web_domain |
| AP_domain.pool | SERVER GROUP SHARING | AP_domain |
| DB_domain.pool | SERVER GROUP SHARING | DB_domain |
| A_DB.pool | SERVER GROUP ONLY | |
| B_DB.pool | SERVER GROUP ONLY | |

FIG.10

STORAGE DOMAIN DATA
360

| STORAGE DOMAIN NAME | REDUNDANCY OF PATH |
|---|---|
| Web_AP_DISK_domain | 2 |
| DB_DISK_domain | 4 |

FIG.12

NETWORK SUB-DOMAIN DATA
470

| NETWORK SUB-DOMAIN NAME | SWITCH MODEL | SWITCH MANAGEMENT IP |
|---|---|---|
| Web-FRONT | SW1234 | 192.168.1.2 |
| | SW1234 | 192.168.1.3 |
| Web-BACK | SW1234 | 192.168.1.2 |
| | SW1234 | 192.168.1.3 |
| AP-FRONT | SW1234 | 192.168.2.4 |
| | SW1234 | 192.168.2.5 |
| AP-BACK | SW1234 | 192.168.2.2 |
| | SW1234 | 192.168.2.3 |
| DB-FRONT | SW1234 | 192.168.3.4 |
| | SW1234 | 192.168.3.5 |

FIG.13

NETWORK DOMAIN DATA
480

| NETWORK DOMAIN NAME | NETWORK SUB-DOMAIN NAME | CONNECTION SYSTEM | DEVICE NAME | BACK NETWORK SUB-DOMAIN NAME | REDUNDANCY SYSTEM |
|---|---|---|---|---|---|
| Internet-Edge | *Internet* | LOAD BALANCER | WEB_LB | Web-Front | NIC SWITCH |
| Web-AP | Web-Back | LOAD BALANCER | AP_LB | AP-Front | HIGH-SPEED SWITCH |
| AP-DB | AP-Back | FIREWALL | DB_FW | DB-Front | NIC SWITCH |

FIG.14

LOAD DISTRIBUTING APPARATUS DATA
490

| LOAD DISTRIBUTING APPARATUS NAME | MANAGEMENT IP | MODEL NAME | SNMP COMMUNITY NAME | ID/PASSWORD |
|---|---|---|---|---|
| Web_LB | 192.168.1.1 | LB_A | public | admin/admin |
| AP_LB | 192.168.2.1 | LB_A | public | admin/admin |

FIG.16

NETWORK SUB-GROUP DATA
660

| NETWORK SUB-GROUP NAME | NETWORK SUB-DOMAIN NAME | SUBNET | SUBNET FOR REDUNCANCY |
|---|---|---|---|
| A_Web-Front | Web-Front | 10.1.1.0/255.255.255.0 | - |
| B_Web-Front | Web-Front | 10.1.1.0/255.255.255.0 | - |
| A_Web-Back | Web-Back | 10.1.3.0/255.255.255.0 | 10.1.11.0/255.255.255.0<br>10.1.12.0/255.255.255.0 |
| B_Web-Back | Web-Back | 10.1.4.0/255.255.255.0 | 10.1.13.0/255.255.255.0<br>10.1.14.0/255.255.255.0 |
| A_AP-Front | AP-Front | 10.1.5.0/255.255.255.0 | 10.1.15.0/255.255.255.0<br>10.1.16.0/255.255.255.0 |
| B_AP-Front | AP-Front | 10.1.6.0/255.255.255.0 | 10.1.17.0/255.255.255.0<br>10.1.18.0/255.255.255.0 |
| A_AP-Back | AP-Back | 10.1.7.0/255.255.255.0 | - |
| B_AP-Back | AP-Back | 10.1.8.0/255.255.255.0 | - |
| A_DB-Front | DB-Front | 10.1.9.0/255.255.255.0 | - |
| B_DB-Front | DB-Front | 10.1.10.0/255.255.255.0 | - |

FIG.17

INTER-SERVER-DOMAIN LINK DATA
670

| FRONT SERVER DOMAIN NAME | NETWORK DOMAIN NAME | BACK SERVER DOMAIN NAME |
|---|---|---|
| *Internet* | Internet-Edge | Web_domain |
| Web_domain | Web-AP | AP_domain |
| AP_domain | AP-DB | DB_domain |

FIG.18

INTER-SERVER/STORAGE-DOMAIN LINK DATA
680

| SERVER DOMAIN NAME | STORAGE DOMAIN NAME |
|---|---|
| Web_domain | Web_AP_DISK_domain |
| AP_domain | |
| DB_domain | DB_DISK_domain |

FIG.19

NETWORK BOOT SERVER DATA
690

| MAC ADDRESS | IP ADDRESS | HOST NAME |
|---|---|---|
| 00:00:E2:6F:55:01 | 192.168.1.2 | host1 |
| UNASSIGNED (AUTO) | 192.168.1.3 | host2 |
| UNASSIGNED (AUTO) | 192.168.1.4 | host3 |

FIG.20

MANAGEMENT TARGET SERVER DATA
700

| SERVER NAME | IP ADDRESS | MAC ADDRESS | SERVER ARCHITECTURE NAME | MODEL NAME | SAN BOOT | STATUS |
|---|---|---|---|---|---|---|
| host 1 | 192.168.1.2 | 00:00:E2:6E:55:01 | ARC_A | MODEL_A | O | NORMAL |
| host 2 | 192.168.1.3 | 00:00:E2:6E:55:02 | ARC_A | MODEL_A | O | NORMAL |
| host 3 | 192.168.1.4 | 00:00:E2:6E:55:03 | ARC_A | MODEL_A | O | NORMAL |
| host 4 | 192.168.1.5 | 00:00:E2:6E:55:04 | ARC_A | MODEL_A | O | NORMAL |
| host 5 | 192.168.1.6 | 00:00:E2:6E:55:05 | ARC_A | MODEL_A | O | NORMAL |
| host 6 | 192.168.2.2 | 00:00:E2:6E:55:06 | ARC_B | MODEL_B | O | NORMAL |
| host 7 | 192.168.2.3 | 00:00:E2:6E:55:07 | ARC_B | MODEL_B | O | NORMAL |
| host 8 | 192.168.2.4 | 00:00:E2:6E:55:08 | ARC_B | MODEL_B | O | NORMAL |
| host 9 | 192.168.2.5 | 00:00:E2:6E:55:09 | ARC_B | MODEL_B | O | NORMAL |
| host 10 | 192.168.2.6 | 00:00:E2:6E:55:0A | ARC_B | MODEL_B | O | NORMAL |
| host 11 | 192.168.3.2 | 00:00:E2:6E:55:0B | ARC_C | MODEL_C | O | NORMAL |
| host 12 | 192.168.3.3 | 00:00:E2:6E:55:0C | ARC_C | MODEL_C | O | NORMAL |
| host 13 | 192.168.3.4 | 00:00:E2:6E:55:0D | ARC_C | MODEL_C | O | NORMAL |
| host 14 | 192.168.3.5 | 00:00:E2:6E:55:0E | ARC_C | MODEL_C | O | NORMAL |
| host 15 | 192.168.3.6 | 00:00:E2:6E:55:0F | ARC_C | MODEL_C | O | NORMAL |

FIG.21

PROVISIONING CONFIGURATION DATA
710

| SERVER NAME | POOL GROUP NAME | SERVER GROUP NAME | STORAGE SUB-GROUP NAME | ACCESS-IBILITY |
|---|---|---|---|---|
| host 1 | Web_domain.pool | – | – | – |
| host 2 | Web_domain.pool | – | – | – |
| host 3 | Web_domain.pool | – | – | – |
| host 4 | Web_domain.pool | – | – | – |
| host 5 | Web_domain.pool | – | – | – |
| host 6 | AP_domain.pool | – | – | – |
| host 7 | AP_domain.pool | – | – | – |
| host 8 | AP_domain.pool | – | – | – |
| host 9 | AP_domain.pool | – | – | – |
| host 10 | AP_domain.pool | – | – | – |
| host 11 | DB_domain.pool | – | – | – |
| host 12 | DB_domain.pool | – | – | – |
| host 12 | DB_domain.pool | – | – | – |
| host 14 | DB_domain.pool | – | – | – |
| host 15 | DB_domain.pool | – | – | – |

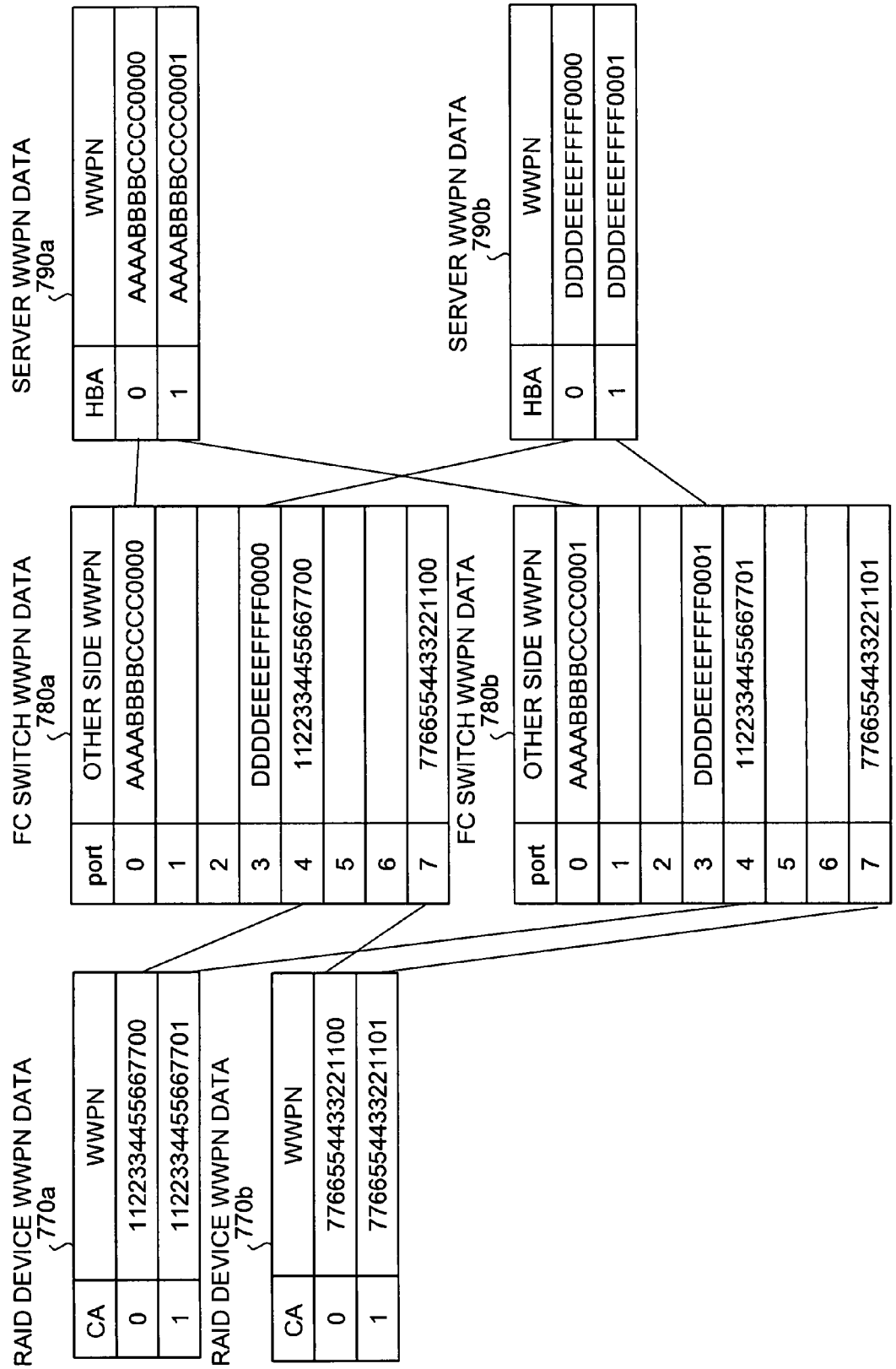

FIG.24
STORAGE TEMPLATE DATA
800

| STORAGE TEMPLATE NAME | DISK TYPE | DISK NAME | RELIABILITY NEED | LOAD LEVEL | DISK CAPACITY | BOOT DISK |
|---|---|---|---|---|---|---|
| A_Web_Str_template | ROOT | disk1 | HIGH | NORMAL | 50 GB | O |
|  |  | disk2 | HIGH | NORMAL | 100 GB | × |
|  | LOCAL | disk3 | HIGH | HIGH | 200 GB | × |
| B_Web_Str_template | ROOT | disk1 | HIGH | NORMAL | 50 GB | O |
|  |  | disk2 | HIGH | NORMAL | 50 GB | × |
|  | LOCAL | disk3 | HIGH | HIGH | 100 GB | × |
| A_AP_Str_template | ROOT | disk1 | HIGH | NORMAL | 200 GB | O |
|  | LOCAL | disk2 | HIGH | HIGH | 200 GB | × |
| B_AP_Str_template | ROOT | disk1 | HIGH | NORMAL | 100 GB | O |
|  | LOCAL | disk2 | HIGH | HIGH | 100 GB | × |
| A_DB_Str_template | ROOT | disk1 | HIGH | NORMAL | 100 GB | O |
|  | LOCAL | disk2 | HIGH | HIGH | 100 GB | × |
|  | SHARED | disk3 | HIGH | HIGH | 500 GB | × |
| B_DB_Str_template | ROOT | disk1 | HIGH | NORMAL | 100 GB | O |
|  | LOCAL | disk2 | HIGH | HIGH | 100 GB | × |
|  | SHARED | disk3 | HIGH | HIGH | 250 GB | × |
| A_Batch_Str_template | ROOT | disk1 | HIGH | NORMAL | 200 GB | O |

FIG.25

SERVER GROUP DATA
810

| SERVER GROUP NAME | SERVER DOMAIN NAME | SOFTWARE DISTRIBUTION IMAGE NAME | VERSION | STORAGE TEMPLATE NAME | SAN BOOT | AUTO RECOVERY |
|---|---|---|---|---|---|---|
| A_Web | Web_domain | A_OS_Web_image | 1.0 | A_Web_Str_template | ○ | × |
| B_Web | Web_domain n | B_OS_Web_image | 1.1 | B_Web_Str_template | ○ | × |
| A_AP | AP_domain | A_OS_AP_image | 1.3 | A_AP_Str_template | ○ | ○ |
| B_AP | AP_domain | B_OS_AP_image | 1.6 | B_AP_Str_template | ○ | ○ |
| A_DB | DB_domain | C_OS_DB_A_image | 1.0 | A_DB_Str_template | ○ | × |
| B_DB | DB_domain | C_OS_DB_B_image | 1.0 | B_DB_Str_template | ○ | × |
| A_Batch | DB_domain | C_OS_Batch_image | 1.1 | A_Batch_Str_template | ○ | × |

FIG. 26

SERVER/STORAGE GROUP LINK DATA
820

| SERVER GROUP NAME | STORAGE GROUP NAME | STORAGE DOMAIN NAME |
|---|---|---|
| A_Web | A_Web_rootdisk | Web_AP_DISK_domain |
| A_Web | A_Web_rootdisk | Web_AP_DISK_domain |
| B_Web | B_Web_rootdisk | Web_AP_DISK_domain |
| B_Web | B_Web_rootdisk | Web_AP_DISK_domain |
| A_AP | A_AP_Web_rootdisk | Web_AP_DISK_domain |
| A_AP | A_AP_Web_rootdisk | Web_AP_DISK_domain |
| B_AP | B_AP_Web_rootdisk | Web_AP_DISK_domain |
| B_AP | B_AP_Web_rootdisk | Web_AP_DISK_domain |
| A_DB | A_DB_rootdisk | DB_DISK_domain |
| A_DB | A_DB_localdisk | DB_DISK_domain |
| A_DB | A_DB_shareddisk | DB_DISK_domain |
| B_DB | B_DB_rootdisk | DB_DISK_domain |
| B_DB | B_DB_localdisk | DB_DISK_domain |
| B_DB | B_DB_shareddisk | DB_DISK_domain |
| A_Batch | A_Batch_rootdisk | |

FIG. 27

INTER-SERVER-GROUP LINK DATA
830

| FRONT SERVER GROUP NAME | NETWORK GROUP NAME | BACK SERVER GROUP NAME |
|---|---|---|
| *Internet* | A_Internet-Edge | A_Web |
| *Internet* | B_Internet-Edge | B_Web |
| A_Web | A_Web-AP | A_AP |
| B_Web | B_Web-AP | B_AP |
| A_AP | A_AP-DB | A_DB |
| B_AP | B_AP-DB | B_DB |

FIG.28

LOAD DISTRIBUTION GROUP DATA
840

| LOAD DISTRIBUTION GROUP NAME | LOAD BALANCER NAME | REPRESENTATIVE IP |
|---|---|---|
| A_Web_LB | Web_LB | 10.0.1.1 |
| B_Web_LB | Web_LB | 10.0.1.2 |
| A_AP_LB | AP_LB | 10.1.3.1 |
| B_AP_LB | AP_LB | 10.1.4.1 |

FIG.29

NETWORK GROUP DATA
850

| NETWORK GROUP NAME | NETWORK DOMAIN NAME | FRONT NETWORK SUB-GROUP NAME | LOAD DISTRIBUTION GROUP NAME | BACK NETWORK SUB-GROUP NAME |
|---|---|---|---|---|
| A_Internet-Edge | Internet-Edge | *Internet* | A_Web-LB | A_Web-Front |
| B_Internet-Edge | Internet-Edge | *Internet* | B_Web-LB | B_Web-Front |
| A_Web_AP | Web_AP | A_Web-Back | A_AP-LB | A_AP-Front |
| B_Web_AP | Web_AP | B_Web-Back | B_AP-LB | B_AP-Front |
| A_AP_DB | AP_DB | A_AP-Back | - | A_DB-Front |
| B_AP_DB | AP_DB | B_AP-Back | - | B_DB-Front |

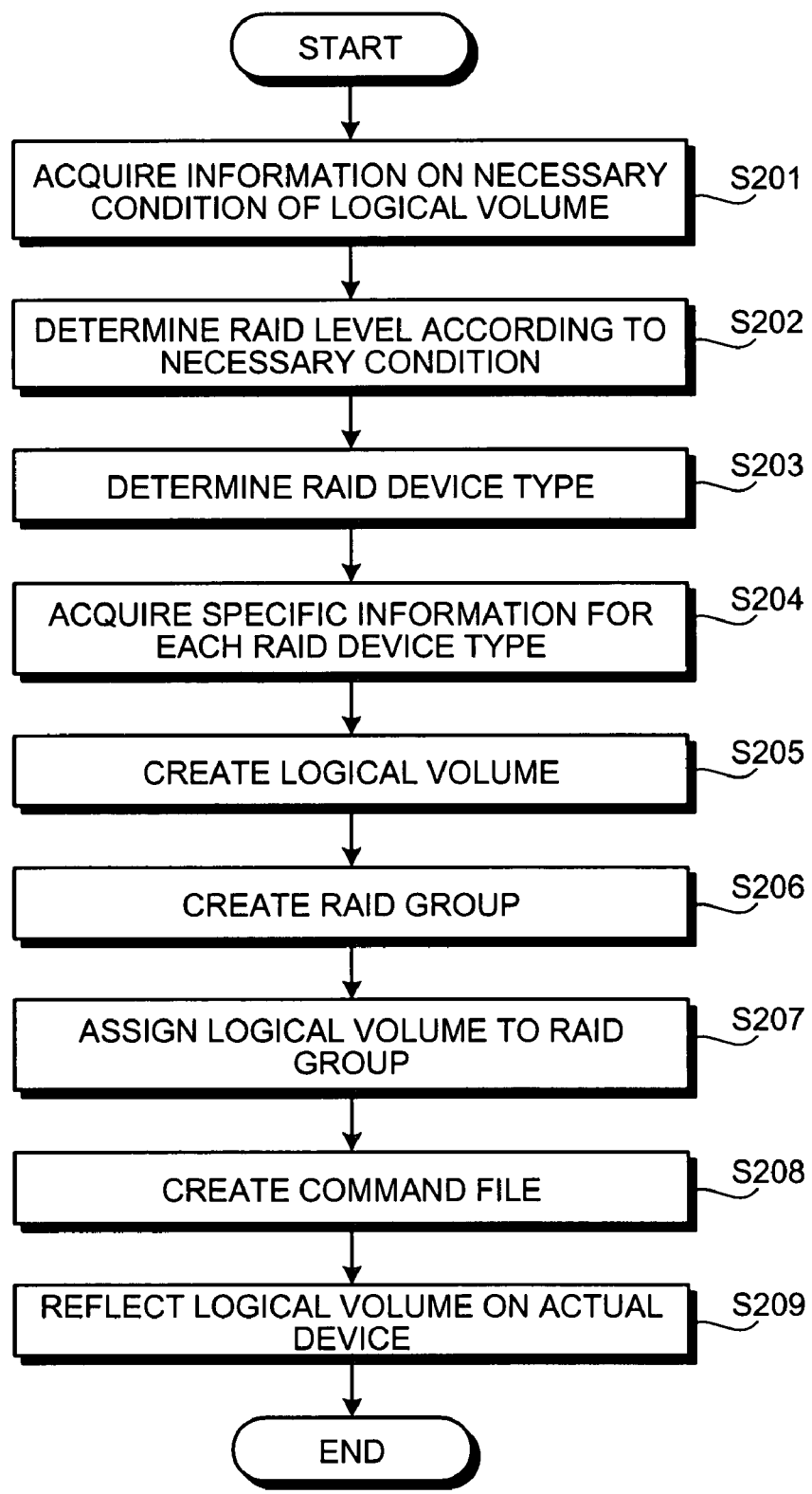

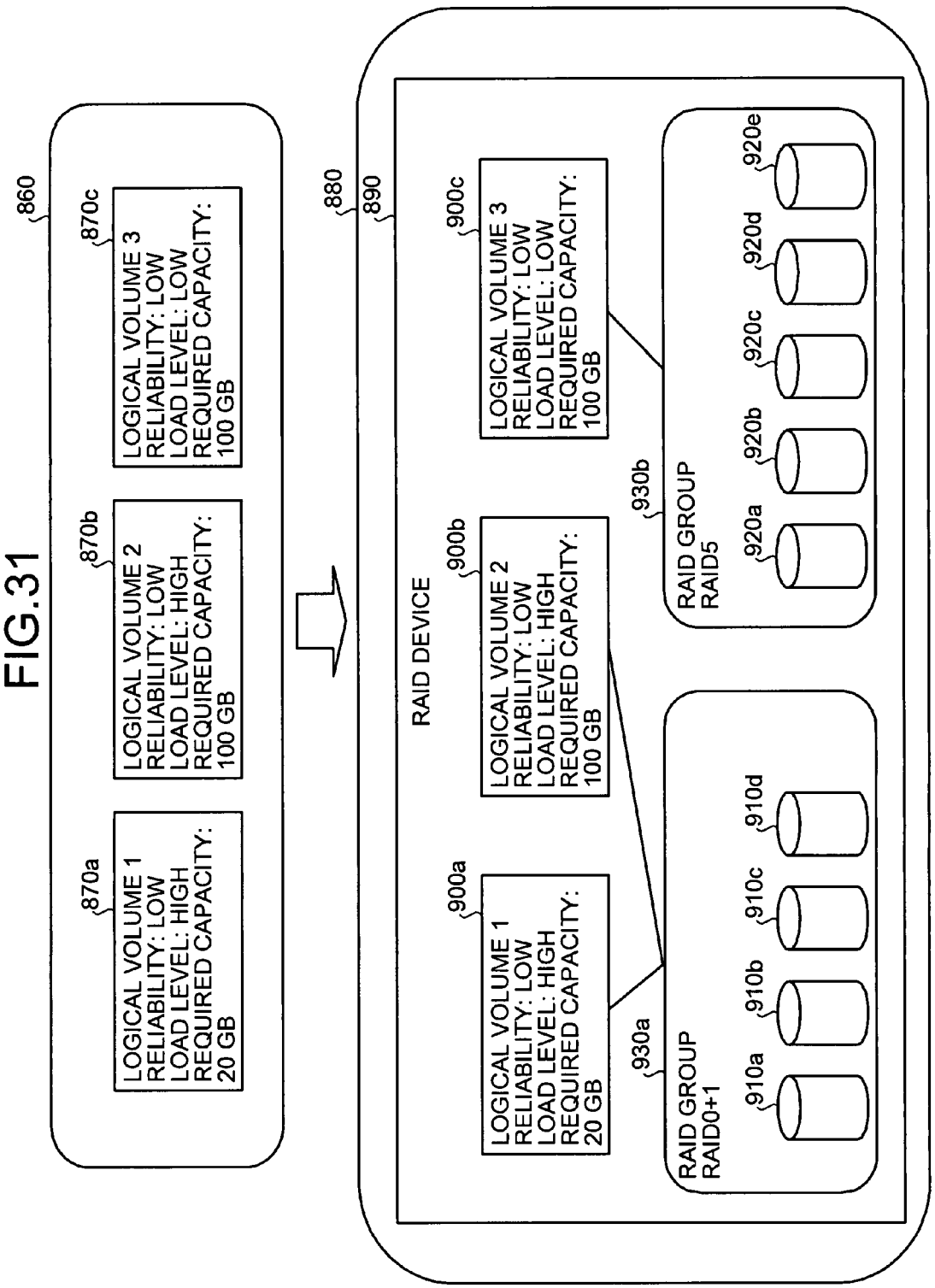

RAID-LEVEL SETTING DATA
940

| RELIABILITY NEED | LOAD LEVEL | RAID LEVEL |
|---|---|---|
| HIGH | HIGH | RAID0+1 |
| HIGH | STANDARD | RAID0+1 |
| HIGH | LOW | RAID5 |
| STANDARD | HIGH | RAID0+1 |
| STANDARD | STANDARD | RAID0+1 |
| STANDARD | LOW | RAID5 |
| LOW | HIGH | RAID0+1 |
| LOW | STANDARD | RAID0+1 |
| LOW | LOW | RAID5 |

FIG.33

RAID DEVICE DATA
950

| TOTAL REQUIRED STORAGE CAPACITY (GB) | RAID DEVICE MODEL | DATA ACCESS SPEED (ORDER OF SPEED) | | | NUMBER OF DISK DRIVES CONFIGURING RAID GROUP (FOR RAID0+1) | NUMBER OF DISK DRIVES CONFIGURING RAID GROUP (FOR RAID5) | MAXIMUM NUMBER OF RAID GROUPS |
|---|---|---|---|---|---|---|---|
| | | FIRST | SECOND | THIRD | | | |
| 0 TO 99 | RAID-Model1 | 18 GB/15 Krpm | 18 GB/10 Krpm | 36 GB/10 Krpm | 4 | 5 | 4 |
| 100 TO 499 | RAID-Model2 | 18 GB/15 Krpm | 18 GB/10 Krpm | 72 GB/10 Krpm | 4 | 5 | 5 |
| 500 TO 999 | RAID-Model3 | 18 GB/15 Krpm | 18 GB/10 Krpm | 144 GB/10 Krpm | 4 | 5 | 6 |

FIG.34

PROVISIONING CONFIGURATION DATA
960

| SERVER NAME | POOL GROUP NAME | SERVER GROUP NAME | STORAGE SUB-GROUP NAME | ACCESS-IBILITY |
|---|---|---|---|---|
| host1 | - | A_Web | A_Web_rootdisk_host1 | O |
| | | | A_Web_localdisk_host1 | O |
| host 2 | - | A_Web | A_Web_rootdisk_host2 | O |
| | | | A_Web_localdisk_host2 | O |
| host 3 | - | B_Web | B_Web_rootdisk_host3 | O |
| | | | A_Web_localdisk_host3 | O |
| host 4 | - | B_Web | B_Web_rootdisk_host4 | O |
| | | | A_Web_localdisk_host4 | O |
| host 5 | Web_domain.pool | - | A_Web_rootdisk_host5 | × |
| | | | A_Web_localdisk_host5 | × |
| | | | B_Web_rootdisk_host5 | × |
| | | | B_Web_localdisk_host5 | × |
| host 6 | - | A_AP | A_AP_rootdisk_host6 | O |
| | | | A_AP_localdisk_host6 | O |
| host 7 | - | A_AP | A_AP_rootdisk_host7 | O |
| | | | A_AP_localdisk_ho st7 | O |
| host 8 | - | B_AP | B_AP_rootdisk_host8 | O |
| | | | B_AP_localdisk_host8 | O |
| host 9 | - | B_AP | B_AP_rootdisk_host9 | O |
| | | | B_AP_localdisk_host9 | O |
| host10 | AP_domain.pool | - | - | - |
| host 11 | - | A_DB | A_DB_rootdisk_host11 | O |
| | | | A_DB_localdisk_host11 | O |
| | | | A_Batch_rootdisk_host11 | × |
| h ost 12 | - | A_DB | A_DB_rootdisk_host12 | O |
| | | | A_DB_localdisk_host12 | O |
| | | | A_Batch_rootdisk_host12 | × |
| h ost 13 | - | B_DB | B_DB_rootdisk_host13 | O |
| | | | B_DB_localdisk_host13 | O |
| host 14 | - | B_DB | B_DB_rootdisk_host14 | O |
| | | | B_DB_localdisk_host14 | O |
| host15 | B_DB_domain.pool | - | - | - |

AFFINITY GROUP DATA
1010

| RAID DEVICE NAME | AFFINITY GROUP NAME | LUN | LV |
|---|---|---|---|
| α | AG0 | 0 | 0 |
| | | 1 | 1 |
| | AG1 | 0 | 0 |
| | | 1 | 1 |
| β | AG10 | 2 | 12 |
| | | 3 | 13 |
| | AG11 | 2 | 12 |
| | | 3 | 13 |

MULTIPATH CONFIGURATION DATA
1020

| MULTIPATH INSTANCE NAME | LUN |
|---|---|
| mplb0 | 0 |
| mplb1 | 1 |
| mplb2 | 2 |
| mplb3 | 3 |

MIRROR VOLUME CONFIGURATION DATA
1030

| MIRROR VOLUME NAME | CONFIGURING DISK NAME |
|---|---|
| M0 | mplb0,mplb2 |
| M1 | mplb1,mplb3 |

IP ADDRESS MANAGEMENT DATA
1040

| IP ADDRESS | ASSIGNMENT DESTINATION |
|---|---|
| 10.1.1.1 | host 1 |
| 10.1.1.2 | host 2 |
| 10.1.1.3-250 | FOR AUTO REGISTRATION |
| 10.1.1.251-254 | DEVICE OUT OF MANAGEMENT |

FIG.41

SOFTWARE IMAGE MANAGEMENT DATA
1050

| SOFTWARE IMAGE NAME | FORMAT | OS PROPERTY | SOFTWARE NAME |
|---|---|---|---|
| A_OS | ARCHIVE FORMAT | y | A_OS RHAS 3.0 |
| B_OS Server | ARCHIVE FORMAT | y | B_OS Server |
| C_OS 8 | ARCHIVE FORMAT | y | C_OS 8 |
| C_OS 9 | ARCHIVE FORMAT | y | C_OS 9 |
| A_Software_L | ARCHIVE FORMAT | n | A_Software for A_OS |
| A_Software_W | ARCHIVE FORMAT | n | A_Software for B_OS |
| MW_A_L | ARCHIVE FORMAT | n | MW_A V7 for A_OS |
| MW_A_W | ARCHIVE FORMAT | n | MW_A V7 for B_OS |
| B_Software | ARCHIVE FORMAT | n | B_Software |
| patch_a | PATCH FORMAT | n | T912345LP-01 |

FIG.42

SOFTWARE DISTRIBUTION IMAGE MANAGEMENT DATA
1060

| SOFTWARE DISTRIBUTION IMAGE NAME | VERSION | SERVER ARCHITECTURE NAME | SOFTWARE IMAGE/SNAPSHOT NAME |
|---|---|---|---|
| A_OS_Web_image | 1.0 | ARC_A<br>ARC_B | apimg_snap_1 |
| A_OS_Web_image | 1.1 | ARC_A<br>ARC_B | apimg_snap_1<br>patch_a |
| B_OS_Web_image | 1.1 | ARC_A | B_OS Server<br>A_Software_W |
| A_OS_AP_image | 1.2 | ARC_A<br>ARC_B | A_OS<br>MW_A_L |
| A_OS_AP_image | 1.3 | ARC_A<br>ARC_B | A_OS<br>MW_A_L<br>patch_a |
| B_OS_AP_image | 1.6 | ARC_A | B_OS Server<br>MW_A_W |
| C_OS_DB_A_image | 1.0 | ARC_C | C_OS 9<br>A_Software |
| C_OS_DB_B_image | 1.0 | ARC_C | C_OS 8<br>B_Software |
| C_OS_Batch_image | 1.1 | ARC_C | C_OS 9 |

FIG.43

SNAPSHOT MANAGEMENT DATA
1070

| SNAPSHOT NAME | SOFTWARE IMAGE NAME |
|---|---|
| apimg_snap_1 | A_OS<br>A_Software_L<br>patch_a |

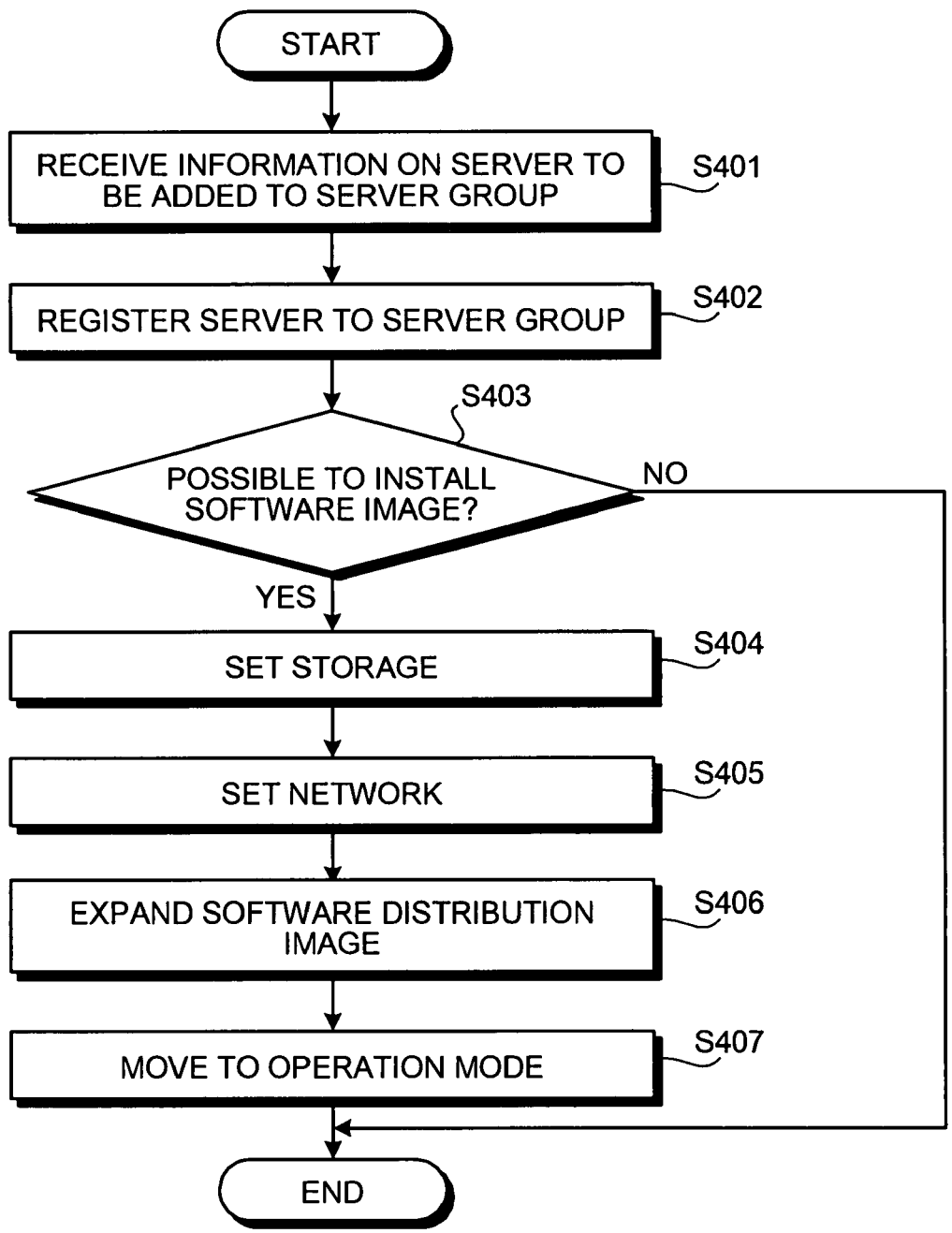

FIG.45

DISTRIBUTION MANAGEMENT DATA
1080 

| SERVER NAME | STORAGE SUB-GROUP NAME | SOFTWARE DISTRIBUTION IMAGE NAME | VERSION | STATUS |
|---|---|---|---|---|
| host1 | A_Web_rootdisk_host1 | A_OS_Web_image | 1.0 | COMPLETE |
| host2 | A_Web_rootdisk_host2 | A_OS_Web_image | 1.0 | DISTRIBUTING··· |
| host3 | A_Web_rootdisk_host3 | B_OS_Web_image | 1.1 | FAILED |
| host4 | A_Web_rootdisk_host4 | B_OS_Web_image | 1.1 | COMPLETE |
| host5 | A_Web_rootdisk_host5 | A_OS_Web_image | 1.0 | COMPLETE |
| | B_Web_rootdisk_host5 | B_OS_Web_image | 1.1 | COMPLETE |
| host6 | A_AP_rootdisk_host6 | A_OS_AP_image | 1.3 | COMPLETE |
| host7 | A_AP_rootdisk_host7 | A_OS_AP_image | 1.3 | COMPLETE |
| host8 | B_AP_rootdisk_host8 | B_OS_AP_image | 1.6 | COMPLETE |
| host9 | B_AP_rootdisk_host9 | B_OS_AP_image | 1.6 | COMPLETE |
| host10 | - | - | - | - |
| host11 | A_DB_rootdisk_host11 | C_OS_DB_A_image | 1.0 | COMPLETE |
| | A_Batch_rootdisk_host11 | C_OS_Batch_A_image | 1.1 | COMPLETE |
| host12 | A_DB_rootdisk_host12 | C_OS_DB_A_image | 1.0 | COMPLETE |
| | A_Batch_rootdisk_host12 | C_OS_Batch_A_image | 1.1 | COMPLETE |
| host13 | B_DB_rootdisk_host13 | C_OS_DB_B_image | 1.0 | COMPLETE |
| host14 | B_DB_rootdisk_host14 | C_OS_DB_B_image | 1.0 | COMPLETE |
| host15 | - | - | - | - |

RESOURCE LAYOUT OUTPUT SCREEN
1090

SERVER LIST SCREEN

STORAGE LIST SCREEN

METHOD, APPARATUS, AND COMPUTER PRODUCT FOR MANAGING OPERATION

This is a continuation filed under 35 U.S.C. §111(a), of International Application No. PCT/JP2004/15382, filed Oct. 18, 2004.

BACKGROUND OF THE INVENTION

1. Field of the Invention

The present invention relates to a technology for managing an operation of resources constituting an information processing system, with a capability of reducing a work of an administrator of the information processing system for setting resources.

2. Description of the Related Art

To reduce a work of an administrator of an information processing system, which occurs when a new resource is added to the information processing system constituting resources such as servers connected via a network, a technology for automatically registering a network address of the resource to be added has been developed.

For example, Japanese Patent Application Laid-open No. 2000-354062 discloses a communication system for, when a new server is added to the information processing system, notifying a network address of the server to all of the communication devices, and, for notifying, when a new communication device is added, a network address of the communication device to all of the servers.

However, with the conventional technology, represented by the one disclosed in Japanese Patent Application Laid-open No. 2000-354062, a notification of the network address of the resource that is newly added is merely performed, so that there is a problem that it is difficult to reduce a work for a series of settings that the administrator has to perform when a resource is added.

In other words, the problem is that although the administrator has to perform various settings for causing the resource to operable, such as a wire connection between resources and an install of a software in addition to the settings of a network address, only a work for a slight part of such settings is removed, so that a burden on the administrator is still large.

SUMMARY OF THE INVENTION

It is an object of the present invention to at least partially solve the problems in the conventional technology.

A computer-readable recording medium according to one aspect of the present invention stores therein a computer program for managing an operation of resources constituting an information processing system. The computer program causes a computer to execute registering a resource domain as a group of resources having a uniform physical wire connection; and executing an install of a software used by a resource that belongs to the resource domain registered at the registering.

A method of managing an operation of resources constituting an information processing system, according to another aspect of the present invention, includes registering a resource domain as a group of resources having a uniform physical wire connection; and executing an install of a software used by a resource that belongs to the resource domain registered at the registering.

An apparatus for managing an operation of resources constituting an information processing system, according to still another aspect of the present invention, includes a domain registering unit that registers a resource domain as a group of resources having a uniform physical wire connection; and a software installing unit that executes an install of a software used by a resource that belongs to the resource domain registered by the domain registering unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 4 is a diagram of an example of site data registered as information on operation management servers;

FIG. 5 is a diagram of an example of domain management server data registered as information on domain management servers;

FIG. 6 is a diagram of an example of management subnet data registered as information on subnets to be managed;

FIG. 7 is a diagram of an example of middleware cooperation IF data including commands for performing various processings in cooperation with middleware;

FIG. 8 is a diagram of an example of server domain data stored as information on server domains to which servers belong;

FIG. 9 is a diagram of an example of pool group data stored as information on pool groups;

FIG. 10 is a diagram of an example of storage domain data stored as information on storage domains;

FIG. 12 is a diagram of an example of network sub domain data stored as information on network sub domains;

FIG. 13 is a diagram of an example of network domain data stored as information on network domains;

FIG. 14 is a diagram of an example of load distributing apparatus data stored as information on load distributing apparatuses;

FIG. 16 is a diagram of an example of network sub group data stored as information on network sub groups;

FIG. 17 is a diagram of an example of inter-server-domain link data stored as information on correspondence relations between server domains;

FIG. 18 is a diagram of an example of inter-server/storage-domain link data stored as information on correspondence relations between server domains;

FIG. 19 is a diagram of an example of network boot server data stored as information on servers to be network booted;

FIG. 20 is a diagram of an example of management target server data stored as information on servers to be managed;

FIG. 21 is a diagram of an example of provisioning configuration data stored as information on groups to which servers belong;

FIG. 23 is a diagram for explaining a processing of checking connection uniformity based on WWPN;

FIG. 24 is a diagram of an example of storage template data stored as information on storage templates;

FIG. 25 is a diagram of an example of server group data stored as information on server groups;

FIG. 26 is a server/storage group link data stored as information on storage groups corresponding to server groups;

FIG. 27 is inter-server-group link data stored as information on correspondence relations between server groups;

FIG. 28 is a diagram of an example of load distribution group data stored as information on groups of load distributing apparatuses;

FIG. 29 is a diagram of an example of network group data stored as information on network groups;

FIG. 30 is a flowchart of a processing procedure of a setting processing of setting logical volumes to a RAID device;

FIG. 31 is a diagram of an example of a setting screen for setting logical volume;

FIG. 33 is a diagram of an example of RAID device data stored as information on RAID devices;

FIG. 34 is a diagram of an example of provisioning configuration data containing storage sub-groups;

FIG. 41 is a diagram of an example of software image management data stored as information on software images;

FIG. 42 is a diagram of an example of software distribution image management data stored as information on software distribution images;

FIG. 43 is a diagram of an example of snapshot management data stored as information on snapshots;

FIG. 44 is a flowchart of a processing procedure of a processing of adding a server to a server group;

FIG. 45 is a diagram of an example of distribution management data stored as information on distribution statuses of software distribution images;

DETAILED DESCRIPTION OF THE PREFERRED EMBODIMENTS

Exemplary embodiments of the present invention are explained in detail below with reference to the accompanying drawings. The present invention is not limited to the embodiments.

Figure 1:
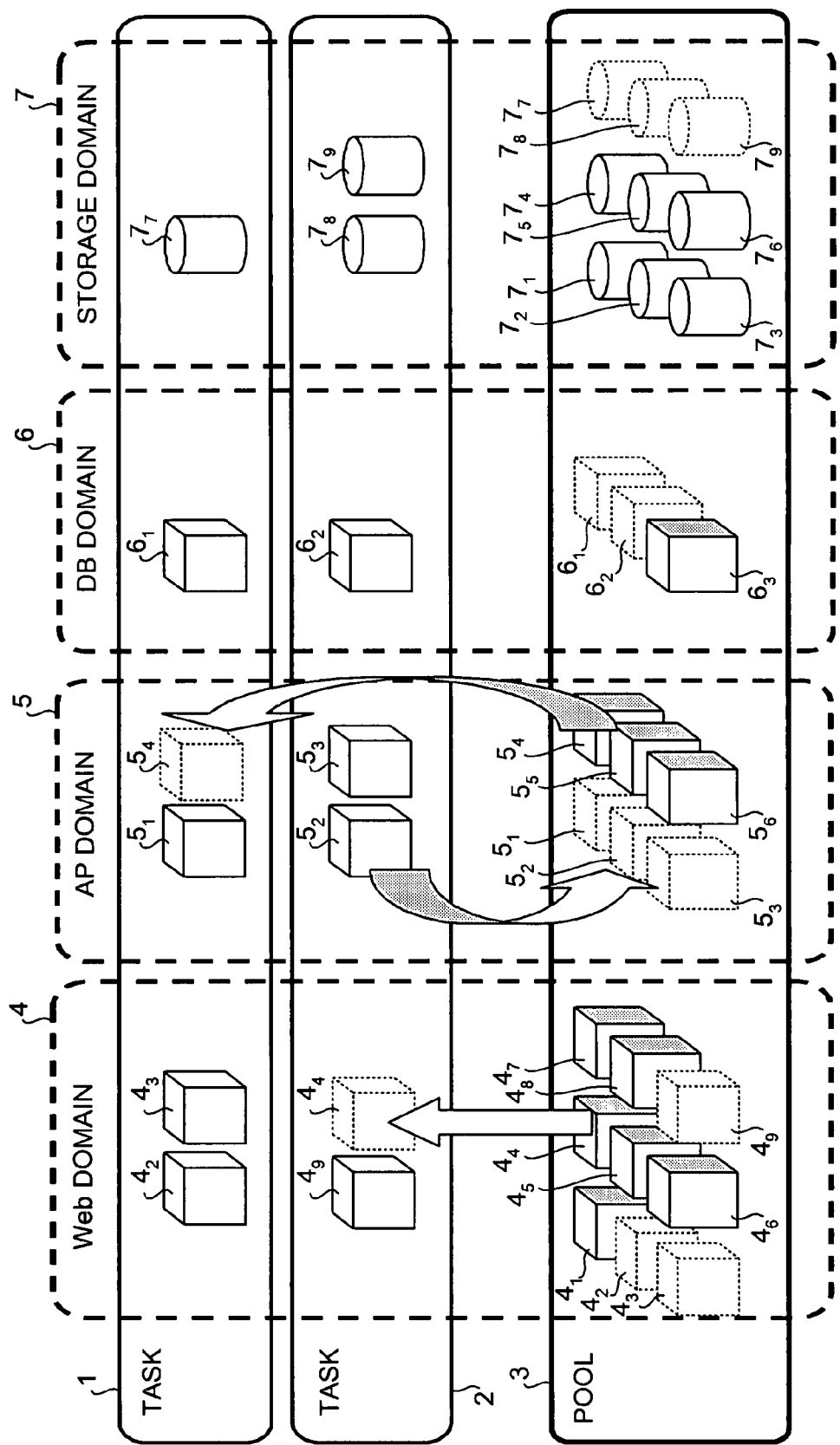
FIG. 1 is a diagram for explaining a concept of an operation management of resources according to an embodiment of the present invention.

FIG. 1 is diagram for explaining the concept of the operation management of resources according to the present invention. In FIG. 1, a case is depicted in which information processing apparatuses such as web servers $4_1$ to $4_9$, AP (Application) servers $5_1$ to $5_6$, DB (Database) servers $6_1$ to $6_3$, and storages $7_1$ to $7_9$ are used for each of tasks 1 and 2.

The web servers $4_1$ to $4_9$ are servers that provide contents to be browsed by web browsers to client terminals via the Internet. The AP servers $5_1$ to $5_6$ are servers that take over execution of information processes requested by the web servers $4_1$ to $4_9$ that have received an information processing request from a user.

The DB servers $6_1$ to $6_3$ are servers that manage accesses to database upon receiving requests for accessing the database from the AP servers $5_1$ to $5_6$. The storages $7_1$ to $7_9$ are storage devices to be connected via a SAN (Storage Area Network) to the web servers $4_1$ to $4_9$, the AP servers $5_1$ to $5_6$, and the DB servers $6_1$ to $6_3$.

With a resource operation management process according to the present invention, a resource group that contains servers or storages having a uniform physical wire connection to other devices is managed as a domain in a LAN (local area network) or a SAN.

For example, in the case shown in FIG. 1, server groups used for the tasks 1 and 2 are managed as a web domain 4, an AP domain 5, and a DB domain 6, while a storage group used for the tasks 1 and 2 is managed as a storage domain 7.

In this case, the web servers $4_1$ to $4_9$ that belong to the web domain 4 have uniform connections to other devices, the AP servers $5_1$ to $5_6$ that belong to the AP domain 5 have uniform connections to other devices, the DB servers $6_1$ to $6_3$ that belong to the DB domain 6 have uniform connections to other devices, and the storages $7_1$ to $7_9$ that belong to the storage domain 7 have uniform connections to other devices.

With the resource assigning management process, unused ones of the web servers $4_1$ to $4_9$, the AP servers $5_1$ to $5_6$, the DB servers $6_1$ to $6_3$, and the storages $7_1$ to $7_9$ are registered to a pool 3 for each domain. The web servers $4_1$ to $4_9$, the AP servers $5_1$ to $5_6$, the DB servers $6_1$ to $6_3$, and the storages $7_1$ to $7_9$ are assigned to each of the tasks 1 and 2 as appropriate.

For example, in the example of FIG. 1, the web servers $4_2$ and $4_3$, the AP server $5_1$, the DB server $6_1$, and the storage $7_7$ are assigned to the task 1, while the web server $4_9$, the AP servers $5_2$ and $5_3$, the DB server $6_2$, and the storages $7_8$ and $7_9$ are assigned to the task 2.

If load on the web servers $4_2$, $4_3$, $4_9$, the AP servers $5_1$, $5_2$, $5_3$, and the DB servers $6_1$, $6_2$ assigned to the tasks 1 and 2 increases, or if storage capacity of the storages $7_7$ to $7_9$ is not enough, the web servers $4_1$, $4_4$ to $4_8$, the AP servers $5_4$ to $5_6$, the DB server $6_3$, and the storages $7_1$ to $7_6$ registered to the pool 3 are added as servers available for the task.

Specifically, by introducing a software required for the web servers $4_1$, $4_4$ to $4_8$, the AP servers $5_4$ to $5_6$, and the DB server $6_3$ registered to the pool 3 and automatically executing setting of the network and the like, the web servers $4_1$, $4_4$ to $4_8$, the AP servers $5_4$ to $5_6$, and the DB server $6_3$ are added as the servers available for the task.

To add the storages $7_1$ to $7_6$, by automatically executing setting of logical volumes and setting of the network to the storages $7_1$ to $7_6$, the storages $7_1$ to $7_6$ are added as the storages $7_1$ to $7_6$ available for the task.

For example, in FIG. 1, the web server $4_4$ that was registered to the pool 3 is added to the web domain 4 of the task 2.

Moreover, according to the resource operation management process, if the web servers $4_2$, $4_3$, $4_9$, the AP servers $5_1$ to $5_3$, the DB servers $6_1$, $6_2$, or the storages $7_7$ to $7_9$ used for the tasks 1 and 2 are not used for a long time, the web servers $4_2$, $4_3$, $4_9$, the AP servers $5_1$ to $5_3$, the DB servers $6_1$, $6_2$, and the storages $7_7$ to $7_9$ are excluded from the servers available for the task and registered to the pool 3.

The web servers $4_2$, $4_3$, $4_9$, the AP servers $5_1$ to $5_3$, the DB servers $6_1$, $6_2$, and the storages $7_7$ to $7_9$ registered to the pool 3 are to be used if the load on the web servers $4_2$, $4_3$, $4_9$, the AP servers $5_1$ to $5_3$, and the DB servers $6_1$, $6_2$, used for other tasks 1 and 2 increases or if the storage capacity of the storages $7_7$ to $7_9$ is not enough.

Specifically, by deleting the software introduced to the web servers $4_2$, $4_3$, $4_9$, the AP servers $5_1$ to $5_3$, and the DB servers $6_1$, $6_2$ and automatically changing setting of the network and the like, the web servers $4_2$, $4_3$, $4_9$, the AP servers $5_1$ to $5_3$, and the DB servers $6_1$, $6_2$ are excluded from the servers available for the tasks 1 and 2 and registered to the pool 3.

Moreover, to exclude the storages $7_7$ to $7_9$ from the storages available for the tasks 1 and 2 and to register them to the pool 3, by automatically executing setting of the network to the storages $7_7$ to $7_9$, the storages $7_7$ to $7_9$ can be excluded from the storages available for the tasks 1 and 2 and registered to the pool 3.

For example, in FIG. 1, the AP server $5_2$ that was registered to the pool 3 is excluded from the servers available for the task in the AP domain 5 of the task 2, and it is registered to the pool 3. The server $5_4$ registered to the pool 3 is reused in such a case that the load on the server $5_1$ used for the task 1 increases, and it is added to the task 1.

As described above, in the operation management process of resources, a domain is managed as a group of servers having a uniform physical wire connection, and software necessary for a server that belongs to the domain is installed. This makes it possible to reduce a work of an administrator of setting servers at operation.

Figure 2:
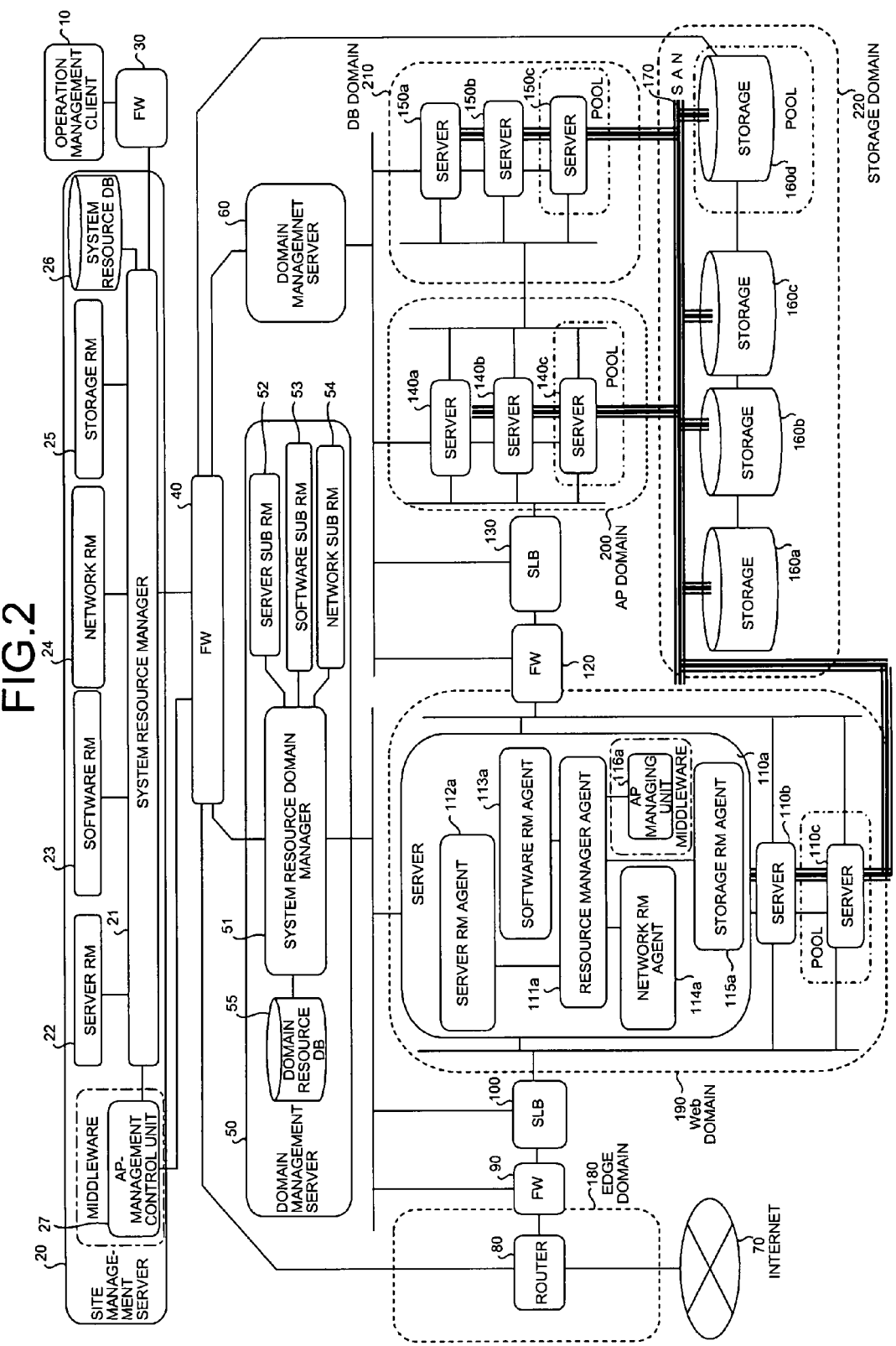
FIG. 2 is a diagram of a functional configuration of a resource-operation management system according to the embodiment.

FIG. 2 is a diagram of the functional configuration of the resource-operation management system according to the embodiment.

As shown in FIG. 2, in the resource-operation management system, an operation management client 10 is connected to a site management server 20 via an FW (firewall) 30 over a network. The site management server 20 is connected over the network to domain management servers 50 and 60 via an FW 40.

Furthermore, the site management server 20 is connected over the network to a router 80 that belongs to an edge domain 180 via the FW 40. The site management server 20 is also connected over the network to storages 160a to 160c that belong to a storage domain 220, and to a storage 160d that is pooled via the FW 40.

The domain management server 50 is connected over the network to an SLB (server load balancer) 100 and to servers 110a to 110c that belong to a web domain 190.

Furthermore, the domain management server 60 is connected over the network to an FW 120, an SLB 130, servers 140a to 140c that belong to an AP domain 200, servers 150a to 150c that belong to a DB domain 210.

The storages 160a to 160c that belong to the storage domain 220, and the storage 160d that is pooled are also connected via a SAN 170 to the servers 110a to 110c that belong to the web domain 190, the servers 140a to 140c that belong to the AP domain 200, and the servers 150a to 150c that belong to the DB domain 210.

In this case, the operation management client 10 is a client device that receives various settings related to the resource-operation management process from the user, sends the setting information to the site management server 20, receives various output results from the site management server 20, and displays the results on a monitor or the like.

The site management server 20 is a server that performs the resource-operation management process as explained in connection with FIG. 1 in cooperation with the domain management servers 50 and 60. The site management server 20 includes a system resource manager 21, a server RM (resource manager) 22, a software RM 23, a network RM 24, a storage RM 25, a system resource DB 26, and an AP-management control unit 27.

The system resource manager 21 is a managing unit that receives various setting information related to the resource-operation management process from the operation management client 10, and operates resources in cooperation with the server RM 22, the software RM 23, the network RM 24, and the storage RM 25. In addition, the system resource manager 21 performs data reception and data transmission between the domain management servers 50 and 60.

The server RM 22 is a managing unit that performs a boot and a shutdown of each of the servers 110a to 110c, 140a to 140c, and 150a to 150c, a collection of information about hardware, a setting, and the like. The server RM 22 performs the above processes in cooperation with a server sub RM 52 of the domain management server 50, and a server RM agent 112a of the server 110a.

The software RM 23 is a managing unit that performs software installation, setting, collection of information about the software, and the like for each of the servers 110a to 110c, 140a to 140c, and 150a to 150c. The software RM 23 performs the above processes in cooperation with a software sub RM 53 of the domain management server 50, and a software RM agent 113a of the server 110a.

The network RM 24 is a managing unit that performs information collection, setting, and the like related to the network. The network RM 24 performs the above processes in cooperation with a network sub RM 54 of the domain management server 50, and a network RM agent 114a of the server 110a.

The storage RM 25 is a managing unit that performs information collection, setting, and the like related to the storages 160a to 160c that belong to the storage domain 220, and relate to the storage 160d that is pooled. The storage RM 25 manages the storages 160a to 160c and the storage 160d pooled without involving the domain management servers 50 and 60.

The system resource DB 26 is a database that contains various resource information managed by the system resource manager 21, the server RM 22, the software RM 23, the network RM 24, and the storage RM 25. Details of stored data are explained later.

The AP-management control unit 27 is a processing unit that controls and manages an AP managing unit 116a. More specifically, the AP-management control unit 27 sends a request for executing process related to an application such as installation and setting to the AP managing unit 116a. Functions of the AP-management control unit 27 are realized by executing middleware installed on the site management server 20.

The domain management servers 50 and 60 are servers that manage resources in a domain or a plurality of domains. The domain management server 50 includes a system resource domain manager 51, the server sub RM 52, the software sub RM 53, the network sub RM 54, and a domain resource DB 55.

The domain management server 60 includes the same function units as the function units of the domain management server 50, and therefore, the function units of the domain management server 60 are not shown in FIG. 2 and explanations thereof are omitted.

The system resource domain manager 51 is a managing unit that performs information collection, setting process, and the like related to resources that belong to each of the domains in cooperation with the server sub RM 52, the software sub RM 53, and the network sub RM 54.

Furthermore, the system resource domain manager 51 performs data reception and data transmission to and from networking equipment such as the site management server 20, an FW 90, and the SLB 100, as well as to and from the servers 110a to 110c to be managed.

The server sub RM 52 is a managing unit that performs boot, shutdown, collection of information about hardware, setting, and the like in cooperation with the server RM 22 and the server RM agent 112a.

The software sub RM 53 is a managing unit that performs software installation, setting, collection of information about software, and the like for each of the servers 110a to 110c in cooperation with the software RM 23 and the software RM agent 113a.

The network sub RM 54 is a managing unit that performs information collection, setting, and the like related to a network in cooperation with the network RM 24 and the network RM agent 114a.

The domain resource DB 55 is a database that stores therein information acquired from the servers 110a to 110c and the system resource DB 26, when the server sub RM 52, the software sub RM 53, or the network sub RM 54 collects various information or specifies settings related to the servers 110a to 110c to be managed. In addition, the domain resource DB 55 stores therein a virtual OS (operating system) used for network boot of the servers 110a to 110c.

The router 80 is networking equipment that performs routing of data packets in data communication via the Internet 70. The FWs 30, 40, 90, and 120 are networking equipments that prevent unauthorized access to each of the servers 110a to 110c, 140a to 140c, and 150a to 150c.

The SLBs 100 and 130 are load balancers that distribute and transfer information-processing requests for the servers 110a to 110c or 140a to 140c to a plurality of the servers 110a to 110c or 140a to 140c. Although switches are also connected in upstream sides and downstream sides of the SLBs 100 and 130, the switches are not shown in FIG. 2.

The servers 110a to 110c, 140a to 140c, and 150a to 150c are servers that perform various information processes. The server 110a includes a resource manager agent 111a, the server RM agent 112a, the software RM agent 113a, the network RM agent 114a, a storage RM agent 115a, and the AP managing unit 116a.

The servers 110b, 140a, 140b, 150a, and 150b include the same function units as those of the server 110a. Therefore, the function units of the servers 110b, 140a, 140b, 150a, and 150b are not shown in FIG. 2, and explanations thereof are omitted.

The servers 110c, 140c, and 150c are servers that are pooled, and do not include each of the resource manager agent 111a, the server RM agent 112a, the software RM agent 113a, the network RM agent 114a, the storage RM agent 115a, and the AP managing unit 116a.

When the server 110c, 140c, or 150c is set as a server available for tasks, a computer program that realizes each of the function units is installed on the server 110c, 140c, or 150c and is executed to realize each of the function units.

The resource manager agent 111a is an agent that receives a request for executing process such as setting and information collection from the domain management server 50 of the system resource domain manager 51 for the server 110a, and performs processes in cooperation with the server RM agent 112a, the software RM agent 113a, the network RM agent 114a, and the storage RM agent 115a.

The server RM agent 112a is an agent that performs a boot and a shutdown of the server 110a, a collection of information about hardware, a setting, and the like. The software RM agent 113a is an agent that performs software installation, setting, and collection of information about software for the server 110a.

The network RM agent 114a is an agent that performs information collection, setting, and the like related to a network connected to the server 110a. The storage RM agent 115a is an agent that performs information collection, setting, and the like related to a storage connected to the server 110a.

The storages 160a to 160c are storages used by the servers 110a to 110c that belong to the web domain 190, the servers 140a to 140c that belong to the AP domain 200, and the servers 150a to 150c that belong to the DB domain 210. The storage 160d is a storage that is pooled. The storages 160a to 160d are constituted of RAID devices.

A VLAN (virtual local area network) is set as a network that connects between the servers 110a to 110c that belong to the web domain 190, the servers 140a to 140c that belong to the AP domain 200, and the servers 150a to 150a that belong to the DB domain 210.

Figure 3:
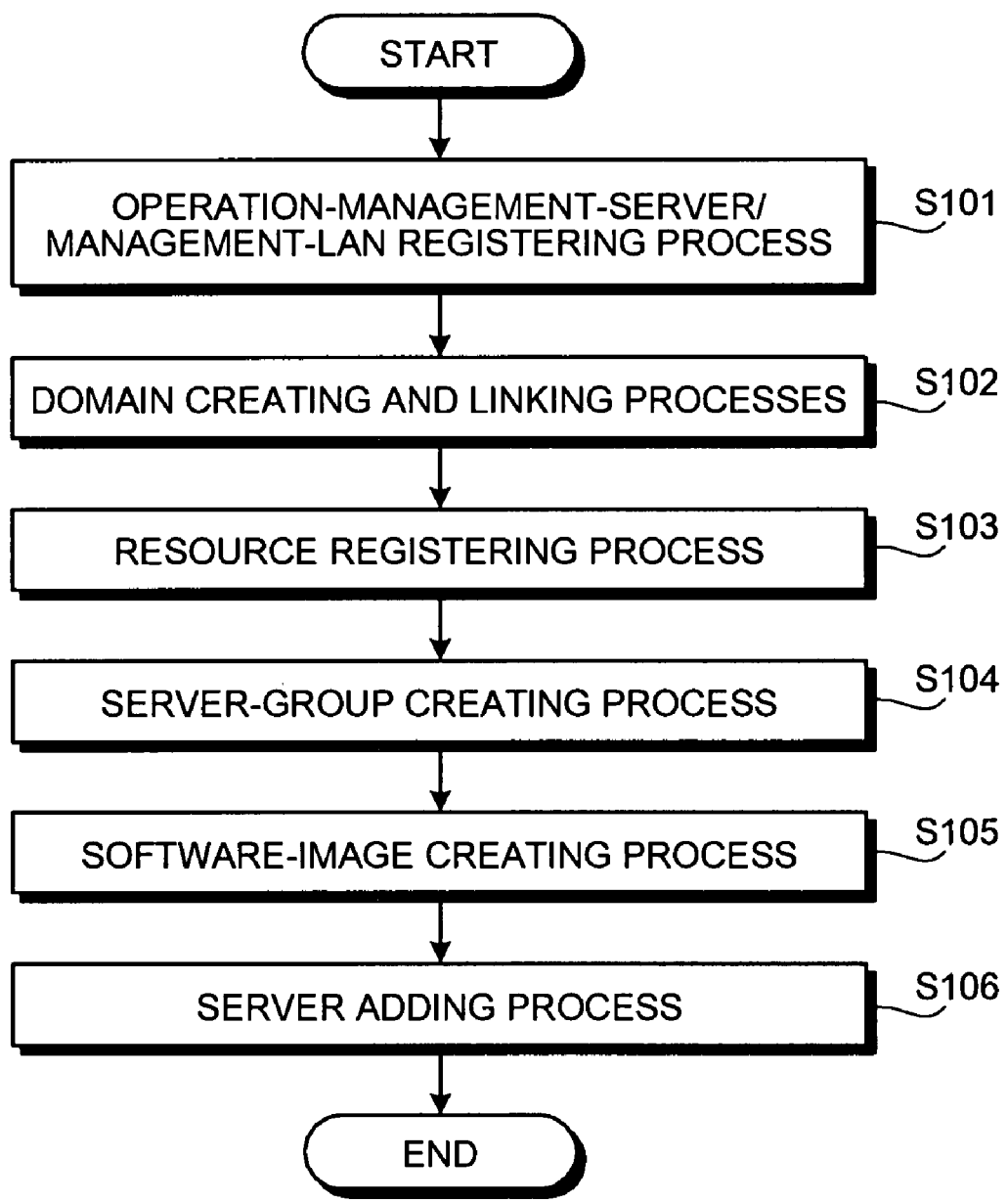
FIG. 3 is a flowchart of a processing procedure for assigning a server to a task according to the embodiment.

A processing procedure of a server assigning process to a task, as described in FIG. 1, is explained next. FIG. 3 is a flowchart of the processing procedure for assigning a server to a task.

In the following explanation, it is assumed that a program is previously installed on the site management server 20, which causes the site management server 20 to perform functions of the system resource manager 21, the server RM 22, the software RM 23, the network RM 24, the storage RM 25, and the AP-management control unit 27.

Furthermore, a program is previously installed on the domain management servers 50 and 60, which causes the domain management servers 50 and 60 to perform functions of the system resource domain manager 51, the server sub RM 52, the software sub RM 53, and the network sub RM 54.

Moreover, programs are previously installed on each of the servers 110a, 110b, 140a, 140b, 150a, and 150b, which cause the servers 110a, 110b, 140a, 140b, 150a, and 150b to perform functions of the resource manager agent 111a, the server RM agent 112a, the software RM agent 113a, the network RM agent 114a, the storage RM agent 115a, and the AP managing unit 116a.

As shown in FIG. 3, the system resource manager 21 of the site management server 20 performs a registering process of an operation management server and a management-LAN (step S101). The operation management server and the management-LAN are the site management server 20, the domain management server 50, and the LAN used for managing management target resources such as the servers 110a to 110c, 140a to 140c, and 150a to 150c, and the SAN 170.

The process performed at step S101 is explained in detail below. FIG. 4 is a diagram of an example of site data 300 registered as information on an operation management server. The site data 300 contains information on site name, site management server name, and domain management server name.

The site name is identification information of a site that includes a resource to be managed. The site management server name is identification information of the site management server 20 set to manage the site. The domain management server name is identification information of the domain management servers 50 and 60 set to manage domains set in the site.

FIG. 5 is a diagram of an example of domain management server data 310 registered as information on the domain management servers 50 and 60. The domain management server data 310 contains information on domain management server name and management subnet name.

The domain management server name is the same information as the domain management server name explained in connection with FIG. 4. The management subnet name is identification information of a subnet (a management subnet) in which a resource is to be managed by the domain management servers.

FIG. 6 is a diagram of an example of management subnet data 320 registered as information on subnets to be managed. The management subnet data 320 contains information on management subnet name, network address, netmask, and default gateway.

The management subnet name is the same information as the management subnet name explained in connection with FIG. 5. The network address is a network address for identifying the management subnet. The netmask is a netmask that defines which bits in an IP address are to be used as the network address. The default gateway is information on an IP address for identifying a default gateway used for transmitting data to outside the management subnet.

At step S101, the system resource manager 21 receives information on site, site management server, and domain management server, which are set by an administrator by operating the operation management client 10, and registers received information to the site data 300 shown in FIG. 4.

The system resource manager 21 receives information on domain management server and management subnet, which are set by the administrator by operating the operation management client 10, and registers received information to the domain management server data 310 shown in FIG. 5.

Thereafter, the system resource manager 21 registers information on network address, netmask, and default gateway, which correspond to the management subnet explained in connection FIG. 5, to the management subnet data 320 shown in FIG. 6.

In addition, the system resource manager 21 notifies the AP-management control unit 27 of occurrence of an event such as addition to or deletion from the servers 110a to 110c, 140a to 140c, and 150a to 150c, and sets commands for executing various processes in cooperation with the AP-management control unit 27.

FIG. 7 is a diagram of an example of middleware cooperation IF data 330 including commands for performing various processes in cooperation with middleware. The middleware cooperation IF data 330 contains information on middleware name, target event, timing, location, and execution command.

The middleware name is information on middleware with which the system resource manager 21 performs processes. The target event is information on events that the system resource manager 21 requests the middleware to execute. The timing is information on timing at which the system resource manager 21 transmits a request for executing processes to the middleware (before or after a process for the target event).

The location is information on locations where the middleware executes a command (a "manager" or an "agent"). The "manager" indicates that the command is executed on the site management server 20, while the "agent" indicates that the command is executed on the servers 110a to 110c, 140a to 140c, and 150a to 150c to be managed. The execution command is information on commands that notifies the middleware of occurrence of various events.

Referring back to FIG. 3, the system resource manager 21 performs a domain creating process and a linking process between created domains (step S102). The processes performed at step S102 is explained in detail below.

FIG. 8 is a diagram of an example of server domain data 340 stored as information on server domains to which the servers 110a to 110c, 140a to 140c, and 150a to 150c belong.

The server domain data 340 contains information on server domain name, server architecture name, and management subnet name. The server domain name is identification information of a domain to which the servers 110a to 110c, 140a to 140c, and 150a to 150c belong.

The server architecture name is identification information of a CPU (central processing unit) architecture of the servers 110a to 110c, 140a to 140c, and 150a to 150c that belong to each of the server domains. The management subnet name is the same information as the management subnet name shown in FIG. 5.

At step S102, the system resource manager 21 receives information on settings of the server domains and the server architectures specified by the administrator by operating the operation management client 10, and registers received information to the server domain data 340. The server domains are set in units of the management subnet set at step S101.

Furthermore, at step S102, the system resource manager 21 sets server groups that belong to each of the server domains, and sets pool groups shared between the server groups and pool groups exclusive to specific server groups.

In this case, the server group is created by classifying servers in the same server domain into one or more groups. The pool group is a pool of the servers assigned to each of the server groups.

FIG. 9 is a diagram of an example of pool group data 350 stored as information on pool groups. The pool group data 350 contains information on pool group name, type, and server domain name.

The pool group name is identification information of a pool of each of the above described servers. The type is information that indicates whether the pool group is to be shared by a plurality of the server groups or to be exclusively permitted for usage by specific server groups. The server domain name is the same information as the server domain name explained in connection with FIG. 8.

The system resource manager 21 assigns the pool group to each of the server domains. When the server domain includes a plurality of the sever groups, the system resource manager 21 assigns the pool group exclusive to the server groups.

Thereafter, the system resource manager 21 receives information on storage domains set by the administrator by operating the operation management client 10, and registers received information to the system resource DB 26 as storage domain data 360 explained below.

FIG. 10 is a diagram of an example of the storage domain data 360 stored as information on storage domains. The storage domain data 360 contains information on storage domain name and redundancy of path. The storage domain name is identification information for identifying a set storage domain. The redundancy of path is information on redundancy of a data communication path on the SAN.

Furthermore, the system resource manager 21 receives information on a network sub domain set by the user by operating the operation management client 10, and registers the information on the system resource DB 26 as network sub domain data 470 explained below.

In this case, the network sub domain is a sub domain obtained by dividing a network domain to which a plurality of network devices that connect servers that belong to different server domains belong.

Figure 11:
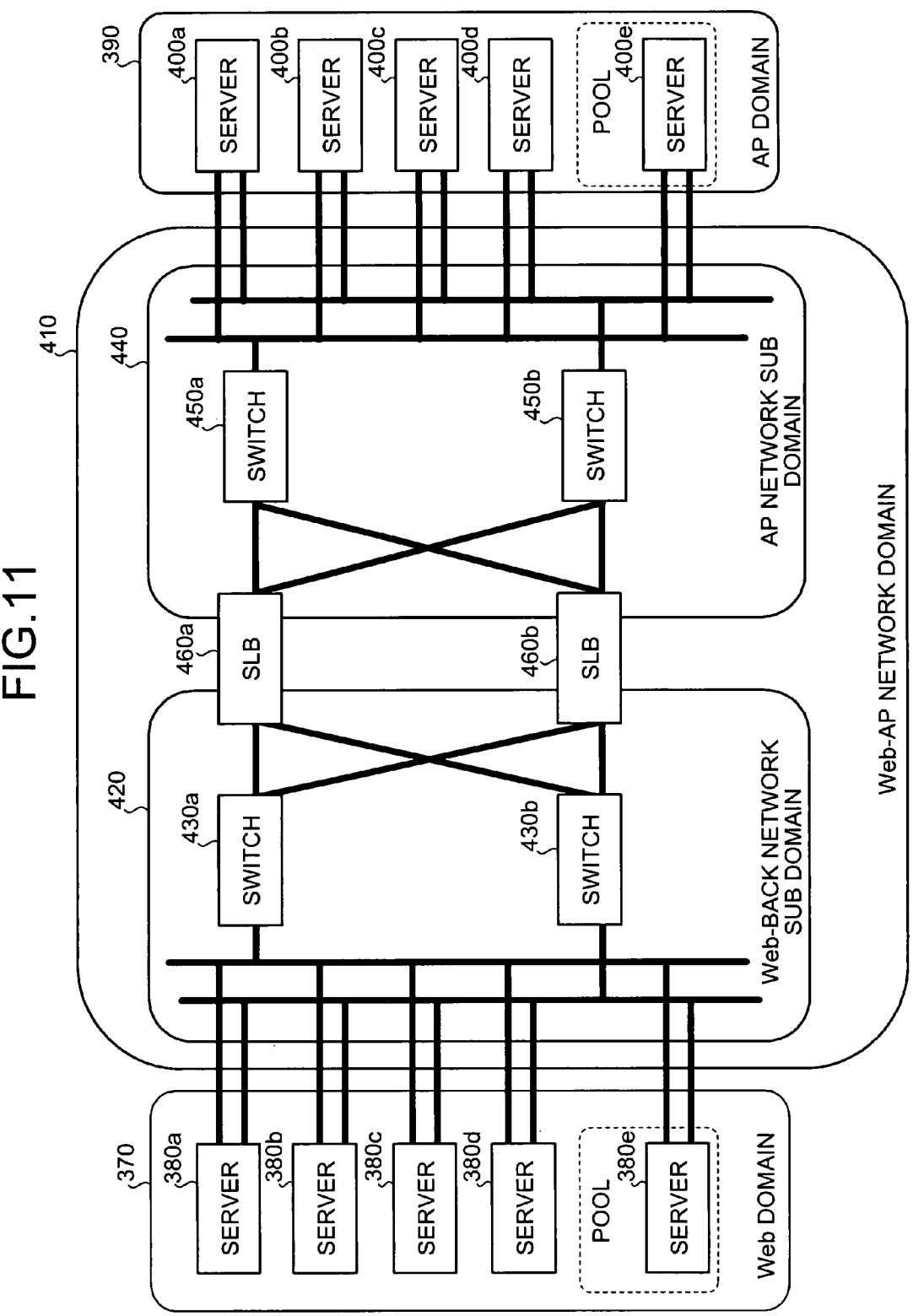
FIG. 11 is a schematic diagram for explaining a network domain and network sub domains.

FIG. 11 is a schematic diagram for explaining a network domain and network sub domains. In FIG. 11, switches 430a, 430b, 450a, and 450b and SLBs 460a and 460b are depicted, which connect servers 380a to 380e that belong to a web domain 370 to servers 400a to 400e that belong to an AP domain 390.

In this case, the switch 430a and the switch 430b constitute a "web-back" network sub domain 420, the switch 450a and the switch 450b constitute an "AP-front" network sub domain 440.

Moreover, the "web-back" network sub domain 420, the "AP-front" network sub domain 440, the SLB 460a, and the SLB 460b constitute a "web-AP" network domain 410.

FIG. 12 is a diagram of an example of the network sub domain data 470 stored as information on network sub domains. The network sub domain data 470 contains information on network sub domain, switch model, and switch management IP.

The network sub domain is information for identifying the network sub domain explained in connection with FIG. 11. The switch model is information on a switch model that belongs to the network sub domain. The switch management IP is information on an IP address assigned to each of the switches for a management.

The system resource manager 21 receives information on the network domain set by the user by operating the operation management client 10, and registers the information on the system resource DB 26 as network domain data 480 explained below.

FIG. 13 is a diagram of an example of the network domain data 480 stored as information on network domains. The network domain data 480 contains information on network domain name, front network sub-domain name, connection system, device name, back network sub-domain name, and redundancy system.

The network domain is identification information for identifying the network domain explained in connection with FIG. 11. The front network sub-domain name is identification information for identifying a network sub-domain closer to the Internet 70, when the network domain is divided into two network sub-domains by the SLBs 460a and 460b as a border.

The connection system is information on a system for connecting the network devices, such as the switches 430a and 430b that belong to the front network sub-domain, to the network devices, such as the switches 450a and 450b that belong to the back network sub-domain. For example, the above systems can include a system requiring a load balancer for a connection and a system requiring a firewall for a connection. The device name is identification information for identifying a network device.

The back network sub-domain, as shown in FIG. 11, is identification information for identifying a network sub-domain closer to the Internet 70, when the network domain is divided into the two network sub-domains by the SLBs 460a and 460b as a border. The redundancy system is information that indicates a redundancy system if the data communication path is redundant on the network domain.

Moreover, the system resource manager 21 receives information on a connection device for the network sub domain set by the user by operating the operation management client 10, registers the information on the system resource DB 26 as load distributing apparatus data 490 described below. The connection device for the network sub-domain indicates devices such as the SLBs 460a and 460b explained in connection with FIG. 11.

FIG. 14 is a diagram of an example of the load distributing apparatus data 490 stored as information on load distributing apparatuses. The load distributing apparatus data 490 contains information on load distributing apparatus name, management IP, model name, SNMP community name, and ID/password.

The load distributing apparatus name is a name for identifying a connection device for the network sub domain. The management IP is information on an IP address assigned to each of the connection devices for administrating the connection device. The model is information on a model of the connection device.

The SNMP (Simple Network Management Protocol) community is information for identifying an SNMP community name to which the domain management servers 50 and 60 and the site management server 20 that manage the connection devices, and an SNMP community to which the connection devices belong. The ID/password is information on an ID and a password required for accessing the connection devices.

The system resource manager 21 receives information on the network sub group set by the user by operating the operation management client 10, registers the information on the system resource DB 26 as network sub group data 660 explained below.

In this case, the network sub group is a plurality of networks obtained by dividing the networks connecting between server groups that belong to different server domains.

Figure 15:
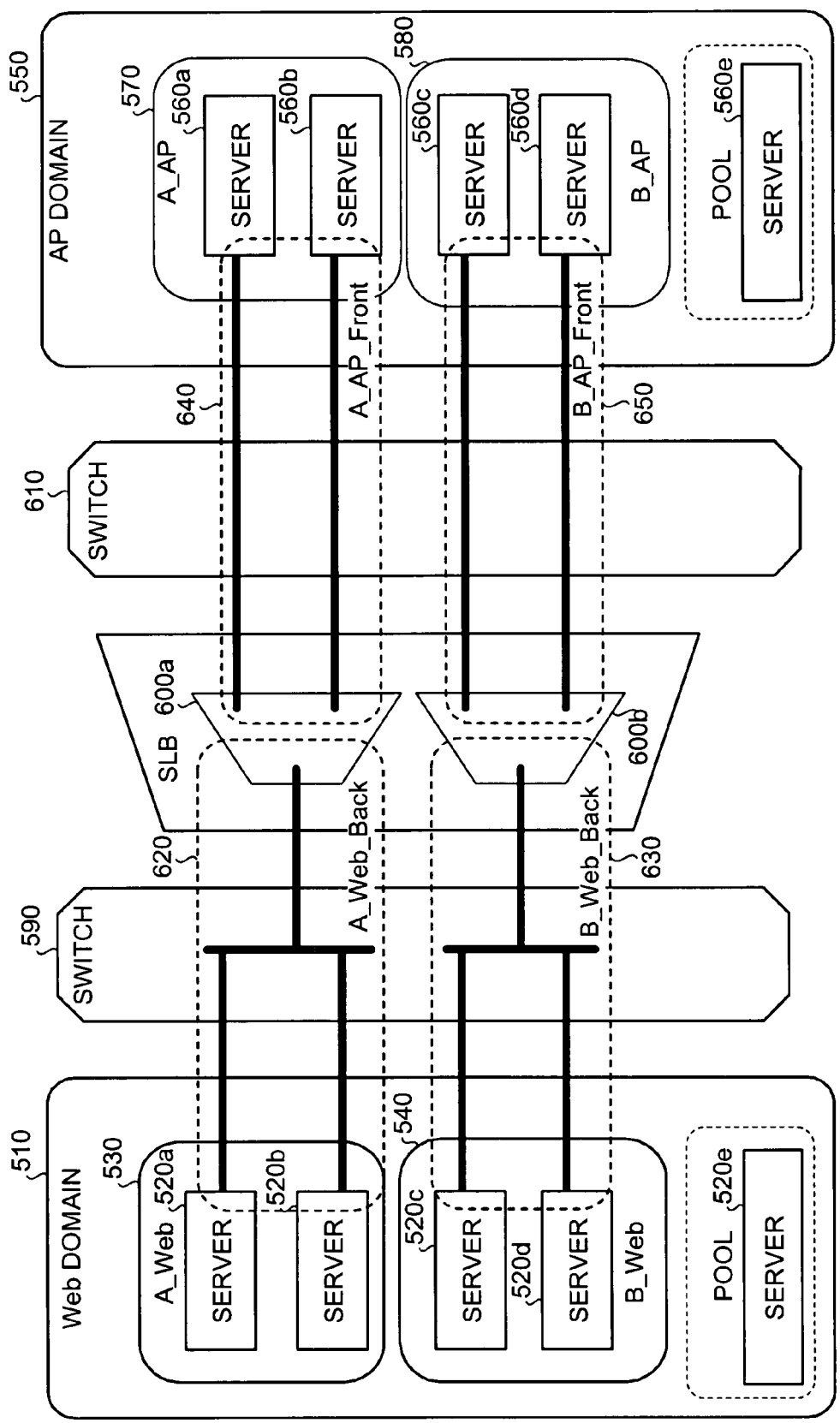
FIG. 15 is a schematic diagram for explaining a configuration of network sub groups.

FIG. 15 is a schematic diagram for explaining a configuration of network sub groups. In FIG. 15, switches 590 and 610, and SLBs 600a and 600b are depicted, which connect servers 520a to 520e that belong to a web domain 510 to servers 560a to 560e that belong to an AP domain 550.

In this case, the servers 520a and 520b constitute an "A_Web" group 530, the servers 520c and 520d constitutes a "B_Web" server group 540, the servers 560a and 560b constitute an "A_AP" server group 570, and the servers 560c and 560d constitute a "B_AP" server group 580.

A network that connects the "A_Web" server group 530 to the SLB 600a constitutes an "A_Web_Back" network sub group 620, a network that connects the "B_Web" server group 540 to the SLB 600b constitutes a "B_Web_Back" network sub group 630, a network that connects the SLB 600a to the "A_AP" server group 570 constitutes an "A_AP_Front" network sub group 640, and a network that connects the SLB 600b to the "B_AP" server group 580 constitutes a "B_AP_Front" network sub group 650.

FIG. 16 is a diagram of an example of the network sub group data 660 stored as information on network sub groups.

The network sub group data 660 contains information on network sub group, network sub domain, subnet, and subnet for redundancy.

The network sub group name is identification information for identifying the network sub groups described in the example in connection with FIG. 15. The network sub-domain name is identification information for identifying a network sub domains to which the network sub group belongs.

The subnet is information on a network address and a subnet mask assigned to the network sub group. The subnet for redundancy is information on the network address and the subnet mask assigned to the network constituted of a redundant data communication line added as an extra, when the network that belongs to the network sub group is made redundant using a plurality of data communication lines.

After that, the system resource manager 21 receives information on association between server domains set by the user by operating the operation management client 10, registers the information on the system resource DB 26 as inter-server-domain link data 670 explained below.

FIG. 17 is a diagram of an example of the inter-server-domain link data 670 stored as information on correspondence relations between server domains. The inter-server-domain link data 670 contains information on front server domain name, network domain name, and back server domain name.

The front server domain name is identification information for identifying a server domain closer to the Internet 70 among the server domains across the network domain shown in FIG. 11. The network domain name is identification information of the network domain explained in connection with FIG. 11. The back server domain name is information indicating a server domain more distant from the Internet 70 among the server domains across the network domain shown in FIG. 11.

Moreover, the system resource manager 21 receives information on association between server domain and storage domain set by the user by operating the operation management client 10, and registers the information on the system resource DB 26 as inter-server/storage-domain link data 680 explained below.

FIG. 18 is a diagram of an example of the inter-server/storage-domain link data 680 stored as information on correspondence relations between server domains. The inter-server/storage-domain link data 680 contains information on server domain name and storage domain name. The server domain name is the same information as the server domain shown in FIG. 8. The storage domain name is the same information as the storage domain shown in FIG. 10.

Referring back to FIG. 3, the system resource manager 21 performs a registering process of server resources and storage resources to be managed (step S103). The process performed at step S103 is explained in detail below.

When the user selects a management subnet to which the server is registered by operating the operation management client 10, the system resource manager 21 receives information on the management subnet selected by the administrator.

The system resource manager 21 also receives information on servers to be managed, which is input by the user by operating the operation management client 10, from the operation management client 10, and stores received information in the domain resource DB 55 of the domain management server 50 as network boot server data 690 explained below. Subsequently, the servers registered are network booted, and registered as the server resources after various information on the severs are acquired.

FIG. 19 is a diagram of an example of the network boot server data 690 stored as information on network boot servers. The network boot server data 690 contains information on MAC address, IP address, and host name.

The MAC address is information on a MAC address of the server. The IP address is information on an IP addresses assigned to the server. The host name is information on a host name assigned to the server.

In this case, upon receiving information on MAC address of the network boot server input by the user, the system resource manager 21 automatically assigns the IP address and the host name to the server corresponding to the MAC address.

The system resource manager 21 performs network boot on the server to which the IP address and the host name are assigned, by using the virtual OS stored in the domain resource DB 55 of the domain management server 50, in cooperation with the system resource domain manager 51 of the domain management server 50.

The server sub RN 52, the resource manager agent 111*a*, and the server RM agent 112*a* work together to collect information on hardware of the server and transmit collected information to the system resource domain manager 51.

Thereafter, the system resource manager 21 acquires information on hardware of the server from the system resource domain manager 51, and stores acquired information in the system resource DB 26 as management target server data 700 explained below.

When the user inputs, by operating the operation management client 10, setting information indicating whether SAN boot is to be performed, in which a server is booted by the storages 160*a* to 160*d* connected via the SAN 170, the system resource manager 21 receives the setting information and registers the setting information to the management target server data 700.

FIG. 20 is a diagram of an example of the management target server data 700 stored as information on servers to be managed. The management target server data 700 contains information on server name, IP address, MAC address, server architecture name, model name, SAN boot, and status.

The server name is a name for identifying a server to be managed. The IP address is an IP address that is assigned to the server. The MAC address is a MAC address of the server. The server architecture name is identification information of a CPU architecture of the server. The model name is information that indicates the model of the server. The SAN boot is setting information as to whether the storages 160*a* to 160*b* connected to the server via the SAN 170 perform SAN boot to boot the server. The status is information that indicates whether an error is occurring in the server.

Although it is assumed herein that the user specifies the MAC address of a network boot server, the server can be automatically selected. Specifically, when the user sets information that specifies the number of servers to be automatically selected by operating the operation management client 10, the system resource manager 21 receives the information from the operation management client 10.

The system resource manager 21 selects servers of specified number, and registers information on an IP address and a host name of the servers to the network boot server data 690 shown in FIG. 19.

In cooperation with the system resource domain manager 51 in the domain management server 50, the system resource manager 21 performs network boot on the servers assigned the IP address and the host name using the virtual OS stored in the domain resource DB 55 in the domain management server 50.

With the cooperation of the server sub RM 52, the resource manager agent 111*a*, and the server RM agent 112*a*, information on the MAC address, server architecture, model, and status of each server is collected and transmitted to the system resource domain manager 51.

After that, the system resource manager 21 acquires the information on the MAC address, server architecture, model, and status of each server from the system resource domain manager 51. The system resource manager 21 stores the information in the system resource DB 26 as the management target server data 700.

Subsequently, the system resource manager 21 registers a storage device to be managed. Examples of the storage device include FC (Fiber Channel) switch and RAID device.

Specifically, when the user inputs information on the IP address of a storage to be registered as a management target with respect to each management subnet shown in FIG. 6, the system resource manager 21 receives the information from the operation management client 10. The system resource manager 21 stores information on a storage device corresponding to the IP address in the system resource DB 26, thereby registering the storage device.

The system resource manager 21 adds the servers registered to the management target server data 700 shown in FIG. 20 to a server domain. Specifically, when the user specifies a server and a server domain where the server is to be added by operating the operation management client 10, the system resource manager 21 receives the information on the server and the server domain from the operation management client 10.

By referring to the management target server data 700 shown in FIG. 20, the system resource manager 21 checks whether the server architecture of the server matches server architecture registered to the server domain data 340 shown in FIG. 8.

The system resource manager 21 reads the management target server data 700 shown in FIG. 20, and checks that SAN boot is to be performed on the server.

Moreover, the system resource manager 21 checks a wire connection status of the network of the server that is added to the server domain. Specifically, the system resource manager 21 reads the inter-server-domain link data 670 shown in FIG. 17, acquires information on a front server domain and a back server domain for the server domain.

The system resource manager 21 reads the network domain data 480 shown in FIG. 13, and acquires information on a front sub domain and a back sub domain corresponding to the network domain.

After that, the system resource manager 21 reads the network sub domain data 470 shown in FIG. 12, and identifies a switch corresponding to the front sub domain and the back sub domain.

The system resource manager 21 requests the network RM 24 and the network sub RM 54 to check wire connections between servers and switches. In addition, the network RM 24 and the network sub RM 54 request the network RM agent 114*a* to check the wire connections between servers and switches, and acquire a check result.

When no error occurs in the wire connections between servers and switches, the system resource manager 21 associates information on the server with the pool group explained in connection with FIG. 9, and stores the information as provisioning configuration data 710 that is explained below in the system resource DB 26.

FIG. 21 is a diagram of an example of the provisioning configuration data 710 stored as information on groups to which servers belong. The provisioning configuration data 710 contains information on server name, pool group name, server group name, storage sub-group name, and accessibility.

The saver name is the same information as described in connection with FIG. 20. The pool group is the same information as described in connection with FIG. 9. The server group name is identification information of a server group when servers on the same server domain are classified into one or more groups. At this point, information on the server group name has not been registered.

The storage sub-group name is identification information of a storage group when storages on the same storage domain are classified into one or more groups and assigned to each server in the server group. At this point, information on the storage sub-group name has not been registered. The accessibility is information that indicates whether a server is allowed to access storages. At this point, information on the accessibility has not been registered.

After registering the saver name and the pool group name to the provisioning configuration data 710, the system resource manager 21 registers the storage device, which has been previously registered, in a storage domain.

Specifically, when the user specifies, by operating the operation management client 10, a storage domain and a storage device registered on the storage domain, the system resource manager 21 receives the information from the operation management client 10.

The system resource manager 21 reads the inter-server/storage-domain link data 680 shown in FIG. 18, and identifies the server domain corresponding to the storage domain.

Moreover, the system resource manager 21 checks uniformity of wire connections between servers that belong to the specified server domain and storage devices that belong to the storage domain, in corporation with the storage RM 25 and the storage RM agent 115*a*.

Figure 22:
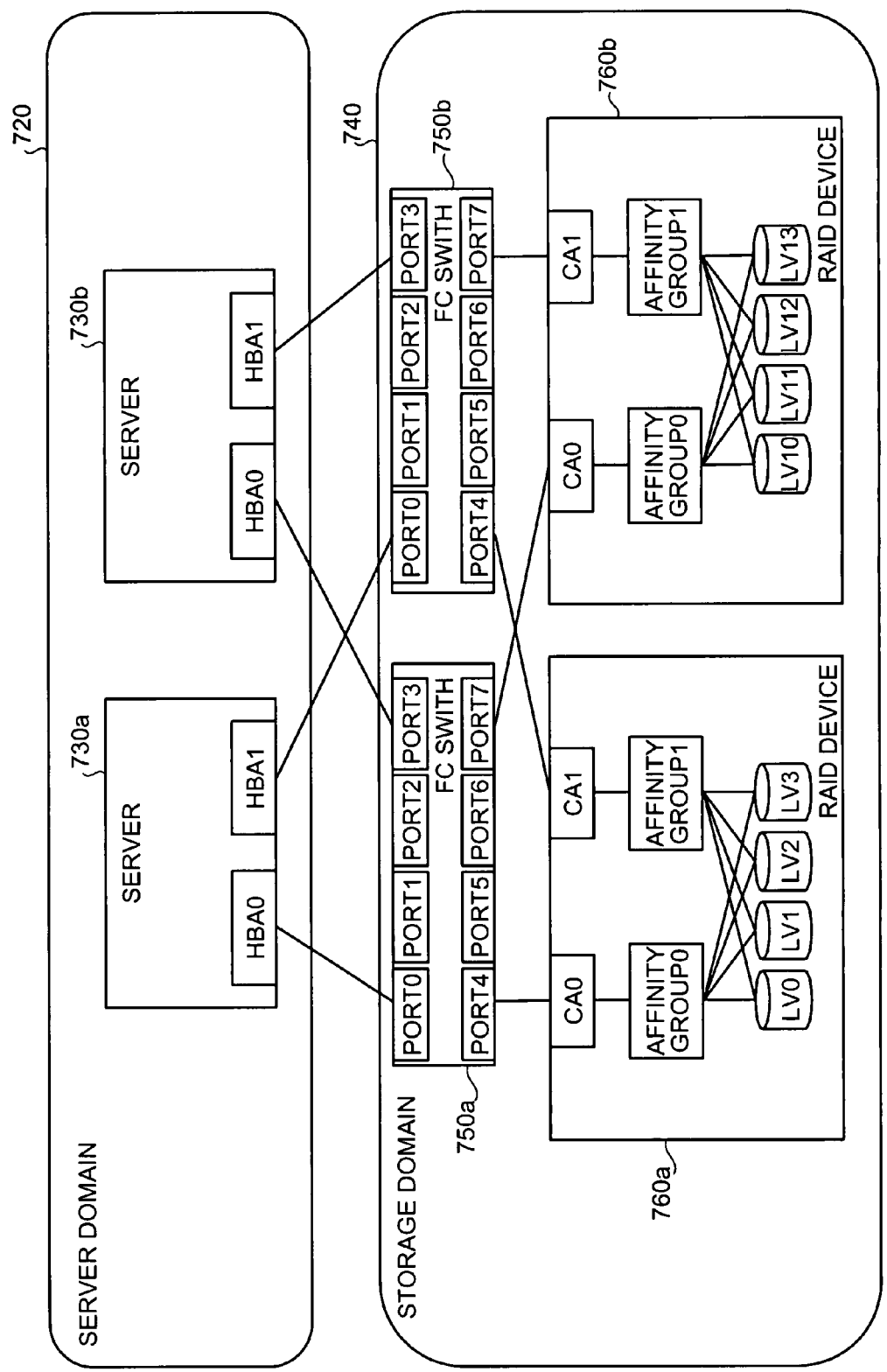
FIG. 22 is a diagram of an example of wire connections between servers and storage devices having uniform connections.

FIG. 22 is a diagram of an example of wire connections between servers and storage devices having uniform connections. In this example, as shown in FIG. 22, a wire connection between an FC switch 750*a* that belongs to a storage domain 740 and servers 730*a* and 730*b* that belong to a server domain 720, and a wire connection between an FC switch 750*b* that belongs to the storage domain 740 and the servers 730*a* and 730*b* are uniform.

In addition, a wire connection between the FC switches 750*a* and 750*b* and a RAID device 760*a* that belongs to the storage domain 740, and a wire connection between the FC switches 750*a* and 750*b* and a RAID device 760*b* that belongs to the storage domain 740 are uniform.

The system resource manager 21 performs the uniformity check of the above wire connections based on information on WWPN (world wide port name). At this check, the system resource manager 21 reads information on redundancy of a storage domain path from the storage domain data 360 shown in FIG. 10, and performs a redundancy check. FIG. 23 is a diagram for explaining a processing of checking connection uniformity based on WWPN.

In FIG. 23, there depicted RAID device WWPN data 770*a* and 770*b* that are stored in the RAID devices 760*a* and 760*b* shown in FIG. 22, FC switch WWPN data 780*a* and 780*b* that are stored in the FC switches 750*a* and 750*b*, and server WWPN data 790*a* and 790*b* that are stored in the servers 730*a* and 730*b*.

The RAID device WWPN data 770*a* and 770*b* contains information on CA (channel adapter) and WWPN. The CA is identification information of a channel adapter included in the RAID devices 760a and 760b. The WWPN is information on WWPN assigned to the channel adapter included in the RAID devices 760a and 760b.

The FC switch WWPN data 780a and 780b contains information on port and other side WWPN. The port is identification information of ports of the FC switches 750a and 750b. The other side WWPN is information on WWPN assigned to the channel adapter of the RAID devices 760a and 760b connected to the ports of the FC switches 750a and 750b, or information on WWPN assigned to an HBA (host bus adapter) of the servers 730a and 730b connected to the ports of the FC switches 750a and 750b.

The server WWPN data 790a and 790b contain information on HBA and WWPN. The HBA is identification information of an HBA included in the servers 730a and 730b. The WWPN is information on WWPN assigned to the HBA included in the servers 730a and 730b.

The system resource manager 21 can check the uniformity of a wire connection between devices by collecting the RAID device WWPN data 770a and 770b, the FC switch WWPN data 780a and 780b, and the server WWPN data 790a and 790b from the RAID devices 760a and 760b, the FC switches 750a and 750b, and the servers 730a and 730b, and by checking the associations of WWPN.

After that, the system resource manager 21 registers a storage area having an LUN (logical unit) set in advance and a storage area having an unset LUN, as storages for a pool.

Subsequently, the system resource manager 21 performs processing of creating a server group (step S104). The processing performed at step S104 are explained in detail below.

The system resource manager 21 receives information on a storage template set by the user by operating the operation management client 10, and registers the information on the system resource DB 26 as storage template data 800 described below. The storage template is setting information on configuration of later created storage for server group.

FIG. 24 is a diagram of an example of the storage template data 800 stored as information on storage templates. The storage template data 800 contains information on storage template, disk type, disk name, reliability need, load level, disk capacity, and boot disk.

The storage template name is identification information for identifying an established storage template. The disk type is information on a type of an application of the disk included in the storage template.

For example, "root" denotes that the disk is used to store therein system data, "local" denotes that the disk is used to store therein individual server data, and "shared" denotes that the disk is used to store therein shared data among servers.

The disk name is a name for identifying a disk, and assigned to each of the disks. The reliability need is information on a reliability needed for the disk. The load level is information on a load level on the disk. The disk capacity is a storage capacity of the disk. The boot disk is information on whether the disk is used to boot a system.

Subsequently, the system resource manager 21 receives information on server groups that are set by a user by operating the operation management client 10, and stores the information in the system resource DB 26 as a server group data 810 explained below.

FIG. 25 is a diagram of an example of the server group data 810 stored as information on server groups. The server group data 810 contains information on server group name, server domain name, software distribution image name, revision, storage template name, SAN boot, and auto recovery.

The server group name is identification information of a group, when servers included in the same server domain are classified into one or a plurality of groups. The server domain name is information on a server domain to which server groups belong. The software distribution image name is identification information for identifying an image file in software distributed to the server that belongs to the server group.

The version is information on a version of a software distribution image. The storage template name is the same information as the storage template name explained in connection with FIG. 24. The SAN boot is information on whether a SAN boot of the servers that belongs to the server group is performed. The auto recovery is information on whether a process of adding a server is automatically executed when a failure occurs in a server having a scale-out configuration in which a plurality of servers cooperatively work.

The system resource manager 21 registers information on a storage group corresponding to the server group on the system resource DB 26 as server/storage group link data 820 explained below. In this case, the storage group denotes that storages included in the same storage domain are classified into one or a plurality of groups.

FIG. 26 is a diagram of an example of the server/storage group link data 820 stored as information on storage groups corresponding to the server groups. The server/storage group link data 820 contains information on server group name, storage group name, and storage domain name.

The server group name is the same information as the server group shown in FIG. 25. The storage group name is identification information of a storage group that is created correspondingly with respect to each of the server groups. The storage domain is identification information of a storage domain to which the storage group belongs.

At the time of creating the storage group, the system resource manager 21 reads information on a storage template associated with the server group from the server group data 810 shown in FIG. 25, and also reads information on a disk type corresponding to the storage template from the storage template data 800 shown in FIG. 24.

The system resource manager 21 creates the storage group with respect to each of disk types such as "root", "local", and "shared" with respect to each of the server groups, and registers the information on the server/storage group link data 820.

Furthermore, the system resource manager 21 reads information on a storage domain corresponding to the server domain to which the server group belongs from the inter-server/storage-domain link data shown in FIG. 18, and registers the information on the server/storage group link data 820.

After that, the system resource manager 21 transmits a command for causing the AP managing unit 116a to recognize that the server group is added to the AP managing unit 116a. Specifically, the system resource manager 21 transmits "issvgrp add" shown in FIG. 7 to the AP managing unit 116a.

Subsequently, the system resource manager 21 receives information on correspondence relations among the server groups that are set by the user by operating the operation management client 10, and registers the information on the system resource DB 26 as inter-server-group link data 830 explained below.

FIG. 27 is a diagram of an example of the inter-server-group link data 830 stored as information on the correspondence relations between the server groups. The inter-server-group link data 830 contains information on front server group name, network group name, and back server group name.

The front server group name is information on a server group closer to the Internet 70 among server groups that are linked via the network group. In this case, the network group denotes a network group consisting of a combination of the network sub groups that link the server groups as explained in connection with FIG. 15.

The network group name is identification information for identifying the network group. The back server group name is information for identifying a server group located more distant from the Internet 70 among server groups that are linked via the network group.

After that, the system resource manager 21 stores information on the network group in the system resource DB 26 as network group data 850 explained below.

Specifically, the system resource manager 21 reads the inter-server-domain link data 670 shown in FIG. 17, and acquires information on a network domain that is set to be sandwiched between two server domains.

The system resource manager 21 reads the network domain data 480 shown in FIG. 13, and acquires information on a front sub domain, a back sub domain, and a device those corresponding to the network domain.

Furthermore, the system resource manager 21 reads the network sub group data 660 shown in FIG. 16, and searches a network sub domain corresponding to the front sub domain and the back sub domain from the network sub group data 660, and then extracts an unused network sub group out of network sub groups corresponding to the searched network sub domain.

Subsequently, the system resource manager 21 classifies a network device corresponding to the information on a device read from the network domain data 480 shown in FIG. 13 into one or a plurality of groups, and stores the information in the system resource DB 26 as load distribution group data 840 explained below.

FIG. 28 is a diagram of an example of the load distribution group data 840 stored as information on groups of load distributing apparatuses. The load distribution group data 840 contains information on load distribution group name, load balancer name, and representative IP.

The load distribution group name is identification information for identifying a group, if a load balancer is classified into one or a plurality of groups. The load balancer name is a name for identifying a load balancer. The representative IP is information on an IP address assigned to each of the load distribution groups.

Thereafter, based on information on correspondence relations among the network domain, the network sub group, the load distribution group that belong to each of the above network groups, the system resource manager 21 stores the information in the system resource DB 26 as the network group data 850 explained below.

FIG. 29 is a diagram of an example of the network group data 850 stored as information on the network groups. The network group data 850 contains information on network group name, network domain name, front network sub group name, load distribution group name, and back network sub group name.

The network group name is the same information as the network group explained in connection with FIG. 27. The network domain name is the same information as the network domain explained in connection with FIG. 17.

The front network sub group name corresponds to the network sub group name explained in connection with FIG. 16, and is identification information for identifying a network sub group closer to the Internet 70 among network sub groups across the load distribution groups.

The load distribution group name is the same information as the load distribution group name explained in connection with FIG. 28. The back network sub group name corresponds to the network sub group name explained in connection with FIG. 16, and is identification information for identifying a network sub group more distant from the Internet 70 among network sub groups across the load distribution groups.

Furthermore, the system resource manager 21 sets up VLAN of the network sub group in a switch that is registered on the network sub domain data 470 shown in FIG. 12 in cooperation with the network RM 24 and the network sub RM 54.

Subsequently, the system resource manager 21 adds a first server into the server group, and performs a process of creating a software image of software that is installed on the server (step S105). The process at step S105 is explained in detail below.

First, if the user specifies a server and a server group where the server is registered by operating the operation management client 10, the system resource manager 21 receives information on the server and the server group and registers the server on the server group.

The system resource manager 21 reads the server group data 810 shown in FIG. 25, and searches a storage template corresponding to the server group, and then acquires a setting condition of the storage template from the storage template data 800 shown in FIG. 24.

The storage RM 25 sets up such a logical volume that fulfills the setting condition of the storage template acquired by the system resource manager 21 to a pooled storage, and performs a process of assigning the storage in which the logical volume is set to the server group.

FIG. 30 is a flowchart of a processing procedure of a setting process of setting a logical volume to a RAID device. As shown in FIG. 30, the system resource manager 21 acquires information on a necessary condition for the logical volume (step S201). In this case, the necessary condition indicates information on reliability need, load level, and disk capacity those stored in the storage template data 800 shown in FIG. 24.

FIG. 31 is a diagram of an example of a setting screen for setting a logical volume. In FIG. 31, there are described a necessary-condition output screen 860 on which the necessary condition for outputting the logical volume from the system resource manager 21 to the operation management client 10 is displayed and a logical-volume-configuration output screen 880 after setting the logical volume.

In the example shown in FIG. 31, a case is described in which three logical volumes that fulfill three necessary conditions needs to be created. Three necessary conditions 870*a* to 870*c* are output onto the necessary-condition output screen 860.

Figure 32:
FIG. 32 is a diagram of an example of RAID-level setting data stored as information on settings of RAID-levels.

Referring back to FIG. 30, the system resource manager 21 determines a RAID level of the RAID device depending on the reliability need and the load level (step S202). FIG. 32 is a diagram of an example of RAID-level setting data 940 stored as information on settings of RAID-levels.

The RAID-level setting data 940 contains information on reliability need, load level, and RAID level. The reliability need is the same information as the reliability need explained in connection with FIG. 24. The load level is the same information as the load level explained in connection with FIG. 24. The RAID level is information on a RAID level that is determined depending on the reliability need and the load level.

Referring back to FIG. 30, the system resource manager 21 determines a model of the RAID device based on a total amount of a required disk capacity (step S203). FIG. 33 is a diagram of an example of RAID device data 950 stored as information on the RAID device.

The RAID device data 950 contains information on total amount of required disk capacity, RAID device model, data access speed, the number of disk drives configuring RAID group (in a case of RAID0+1), the number of disk drives configuring RAID group (in a case of RAID5), and the maximum number of RAID groups.

The total amount of required disk capacity is information on a total amount of a disk capacity required for a logical volume. The RAID device model name is information on a model name of a RAID device appropriate for ensuring the total amount of the required disk capacity.

The data access speed is information on a data access speed of a disk drive that is specified by the RAID device model. The data access speed contains information on three types of the "first", "second", and "third" disk drives in order of data access speed.

The number of disk drives configuring RAID group (in a case of RAID0+1) is information on the number of disk drives configuring a RAID group in the case of RAID0+1. The number of disk drives configuring RAID group (in a case of RAID5) is information on the number of disk drives configuring a RAID group in the case of RAID5. The maximum number of RAID groups is information on the maximum number of RAID groups to be created.

Referring back to FIG. 30, the system resource manager 21 acquires unique information with respect to each of the RAID device models from the RAID device data 950 as explained in connection with FIG. 33 (step S204).

In this case, the unique information is information on a type of the "first" disk drive out of the data access speed, the number of disk drives configuring the RAID group (in the case of RAID0+1), the number of disk drives configuring the RAID group (in the case of RAID5), and the maximum number of the RAID groups.

Then, the storage RM 25 creates a logical volume (step S205). Specifically, the storage RM 25 creates such a logical volume that fulfills each of the necessary conditions of the logical volume, and sets up the logical volume in the RAID device.

On the logical-volume-configuration output screen 880 shown in FIG. 31, a case is described in which logical volumes 910a to 910d and 920a to 920e that fulfill each of the necessary conditions 900a to 900c are set in the RAID device 890.

Referring back to FIG. 30, the storage RM 25 creates a RAID group in which the logical volumes are grouped by each of RAID levels (step S206). Then, the storage RM 25 assigns a logical volume to the created RAID group (step S207).

In the example shown in FIG. 31, the logical volumes 910a to 910d that fulfill the necessary conditions 900a and 900b have the same RAID level of RAID0+1, and thus the logical volumes 910a to 910d are grouped into a RAID group 930a. In addition, the logical volumes 920a to 920e that fulfill the necessary condition 900c have the same RAID level of RAID5, and thus the logical volumes 920a to 920e are grouped into a RAID group 930b.

Upon creating the RAID groups, the storage RM 25 sets disk drives that belong to each of the RAID groups to disk drive types that are determined based on the data access speed of the RAID device data 950 shown in FIG. 33.

Furthermore, the storage RM 25 sets the number of disk drives that configure a RAID device to the number of disk drives determined based either on the number of disk drives configuring the RAID group (in the case of RAID0+1) or the number of disk drives configuring the RAID group (in the case of RAID5) those included in the RAID device data 950 shown in FIG. 33.

Furthermore, the storage RM 25 creates such RAID groups that the number of the RAID groups is below the maximum number of the RAID groups included in the RAID device data 950 shown in FIG. 33.

On the logical-volume-configuration output screen 880 shown in FIG. 31, the logical volumes 910a to 910d and 920a to 920e, which fulfill the necessary conditions 900a to 900c and are respectively assigned to the RAID groups 930a and 930b, are respectively connected to the corresponding necessary conditions 900a to 900c by lines.

Referring back to FIG. 30, the storage RM 25 creates a command file that reflects the configuration of the logical volumes shown in FIG. 31 to the RAID device (step S208). Then, the storage RM 25 reflects the created logical volume to the actual apparatus based on the command file (step S209).

After that, the system resource manager 21 registers the logical volume set in the RAID device as a storage sub group by associating the logical volume with server groups to which each of servers belongs, and sets an access right to the server groups of the servers. Specifically, the system resource manager 21 stores information on server group name, storage sub group name, and availability of access in the provisioning configuration data 710 shown in FIG. 21.

FIG. 34 is a diagram of an example of provisioning configuration data 960 containing storage sub-groups. The provisioning configuration data 960 contains information on server group, storage sub group, and availability of access in addition to the provisioning configuration data 710 shown in FIG. 21.

When the logical volume configured in the RAID device is to be recognized by a server and registered as a storage sub group, the storage RM 25 sets up the logical volume in the following procedure.

Figure 35:
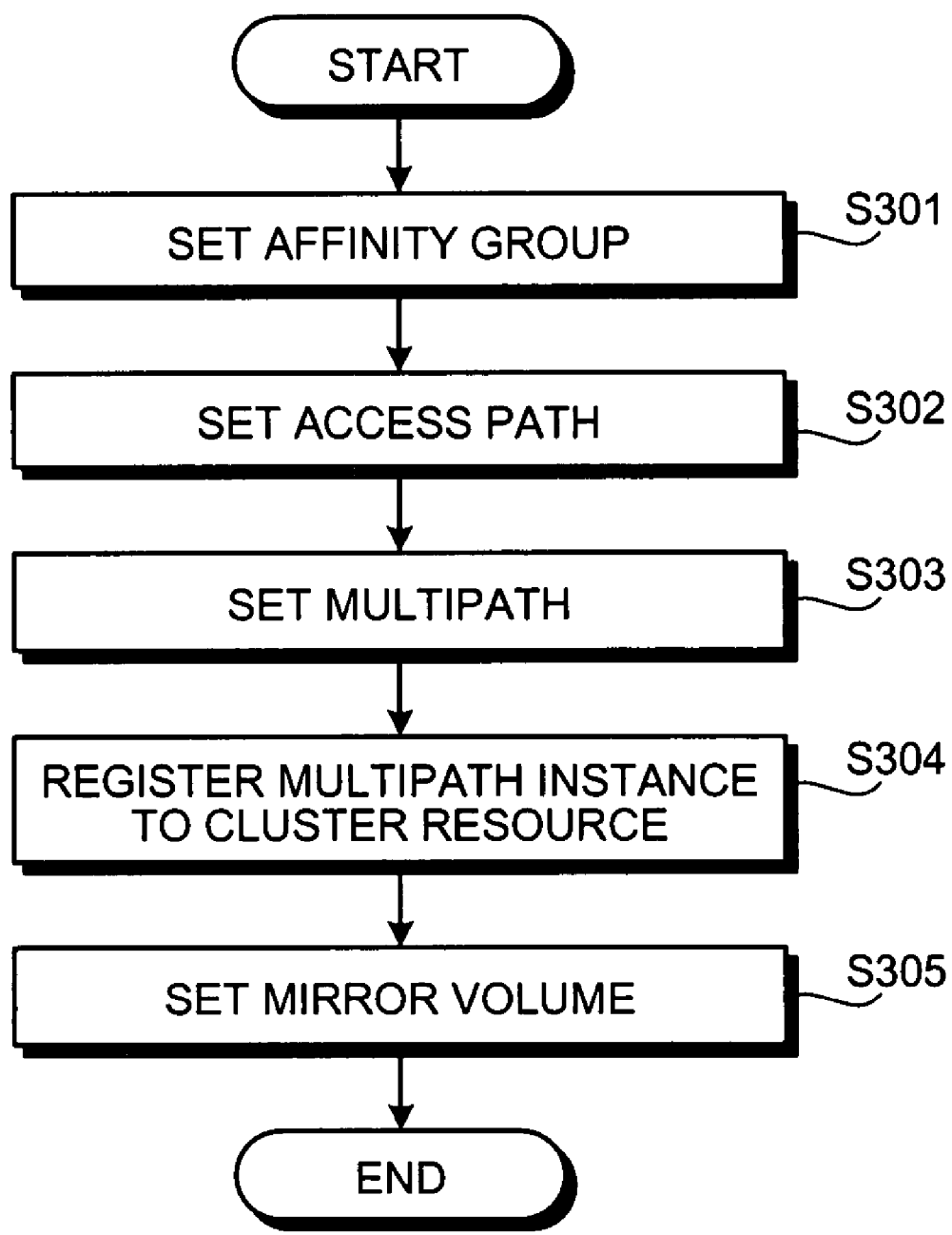
FIG. 35 is a flowchart of a processing procedure of a processing of setting a logical volume, in which a server recognizes the logical volume.

FIG. 35 is a flowchart of a processing procedure of a process of setting a logical volume, in which the server recognizes the logical volume. As shown in FIG. 35, the storage RM 25 groups logical volumes included in a RAID device, and sets up an affinity group (step S301).

In this case, the affinity group is information on a correspondence relation between a logical unit number (LUN) to be recognized by the server and a logical volume (LV) number in the RAID device.

Figure 36:
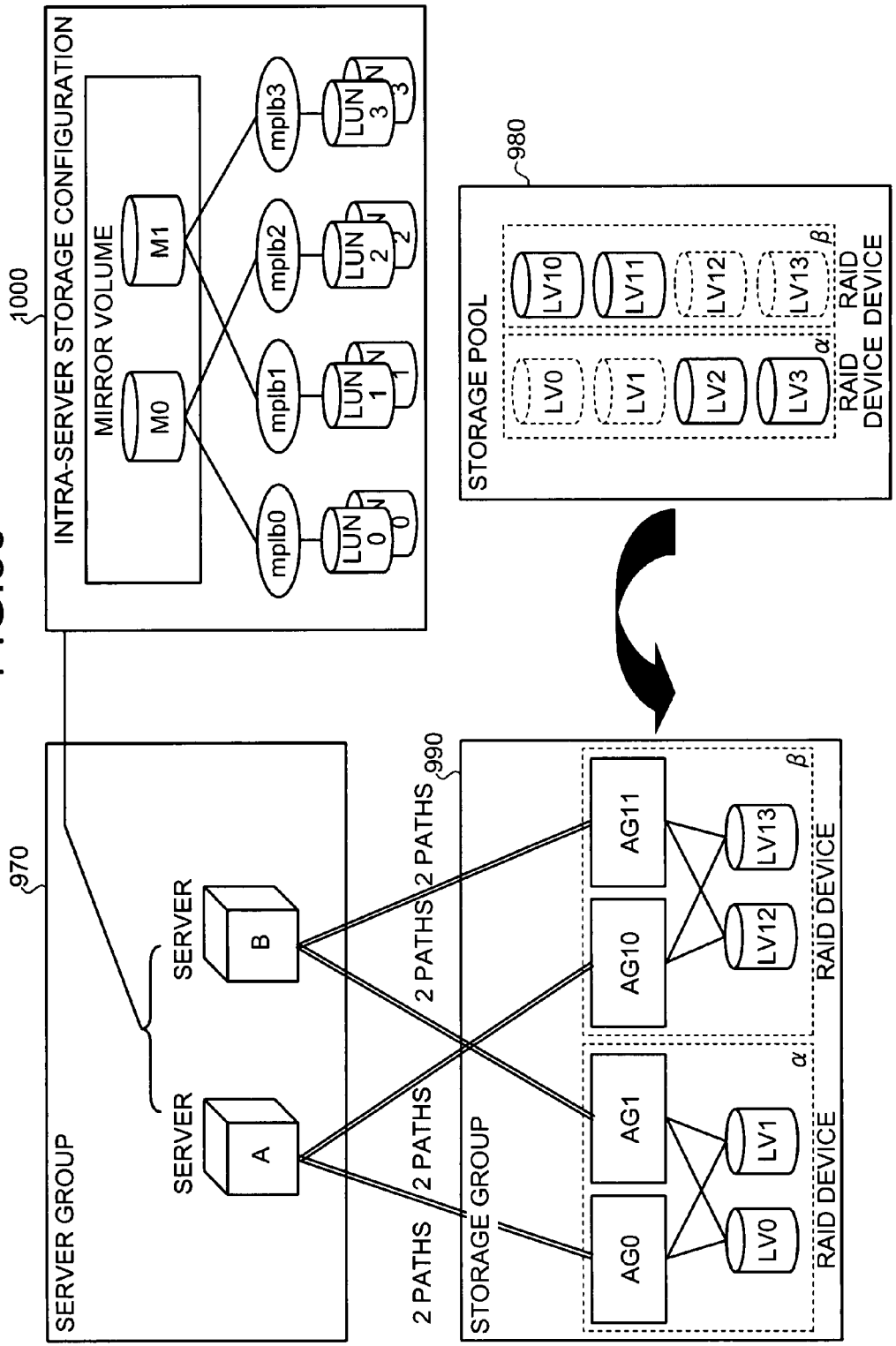
FIG. 36 is a schematic diagram for explaining a processing of setting a logical volume configured in a RAID device.

FIG. 36 is a schematic diagram for explaining a process of setting the logical volume configured in the RAID device. In FIG. 36, there are described a server group 970, which is configured by a server "A" and a server "B", and a storage pool 980, which is configured by a RAID device "α" in which logical volumes "LV0", "LV1", "LV2", and "LV3" are configured and a RAID device "β" in which logical volumes "LV10", "LV11", "LV12", and "LV13" are configured.

Moreover, in FIG. 36, there is described a storage group 990 to which the logical volumes "LV0" and "LV1" in the RAID device "α" and the logical volumes "LV12" and "LV13" in the RAID device "β" are added from the storage pool 980.

The logical volumes "LV0" and "LV1" in the RAID device "α", which are added into the storage group 990, are set to belong to an affinity group "AG0" and an affinity group "AG1". Also, the logical volumes "LV12" and "LV13" in the RAID device "β" are set to belong to an affinity group "AG10" and an affinity group "AG11".

Figure 37:
FIG. 37 is a diagram of an example of affinity group data stored as information on affinity groups.

FIG. 37 is a diagram of an example of affinity group data 1010 containing information on affinity groups. The affinity group data 1010 contains information on RAID device name, affinity group name, LUN, and LV.

The RAID device is identification information for identifying each of RAID devices. The affinity group name is information on an affinity group that is set in each of the RAID devices. The LUN is identification information for identifying a logical volume when accessed from the server A or the server B. The LV is identification information for identifying a logical volume.

Referring back to FIG. 35, the storage RM 25 checks redundancy paths between the servers "A" and "B" and the logical volumes "LV0", "LV1", "LV12", and "LV13", and sets an access path by selecting a path (step S302).

Figure 38:
FIG. 38 is a diagram of an example of multipath configuration data stored as information on multipath configurations.

The storage RM 25 sets a multipath for a logical unit (step S303). FIG. 38 is a diagram of an example of multipath configuration data 1020 stored as information on multipath configurations.

The multipath configuration data 1020 contains information on multipath instance and LUN. The multipath instance name is information for identifying an instance of set multipath. The LUN is information for identifying a logical unit that corresponds to the set multipath instance and that is to be recognized by the server "A" or the server "B".

The storage RM 25 registers the set multipath instance as a constituent element of the mirror volume on a cluster resource of the server to which a clustering is performed (step S304). Thereafter, the storage RM 25 sets a mirror volume group constituted of a pair of volumes of different RAID devices, using the multipath instance registered on the cluster resource (step S305).

An intra-server storage configuration 1000 set inside the server "A" or the server "B" is described in FIG. 36. In the storage configuration 1000, a mirror volume "M0" configured with a multipath instance "mplb0" and a multipath instance "mplb2", and a mirror volume "M1" configured with a multipath instance "mplb1" and a multipath instance "mplb3" are set.

Figure 39:
FIG. 39 is a diagram of an example of mirror volume configuration data stored as information on configurations of mirror volumes.

FIG. 39 is a diagram of an example of mirror volume configuration data 1030 stored as information on configurations of mirror volumes. The mirror volume configuration data 1030 contains information on mirror volume and configuring disk.

The mirror volume is identification information for identifying a set mirror volume. The configuring disk is identification information for identifying a logical unit constituting the mirror volume. The configuring disk stores therein information on the multipath instance stored as the multipath configuration data 1020 shown in FIG. 38. Accordingly, it is possible to specify the LUN corresponding to the mirror volume by referring to the multipath configuration data 1020.

The affinity group data 1010 shown in FIG. 37 is stored in the system resource DB 26 and the RAID device by the storage RM 25. The multipath configuration data 1020 shown in FIG. 38 and the mirror volume configuration data 1030 shown in FIG. 39 are stored in the system resource DB 26 by the storage RM 25, and stored, by the storage RM agent 115*a*, in the server to be managed.

Referring back to the explanation of the processing of creating the software image at step S105 shown in FIG. 3, the network RM 24 performs a setting of a network of the server registered on the server group.

Specifically, the network RM 24 reads information on a network group that includes the server group to which the server is added as a front server group and a back server group, from the inter-server-group link data 830 shown in FIG. 27.

Moreover, the network RM 24 reads the network group data 850 shown in FIG. 29 and extracts a front network sub group and a back network sub group corresponding to the network group.

Thereafter, the network RM 24 reads the network sub group data 660 shown in FIG. 16, searches the network sub group corresponding to the front network sub group and the back network sub group, and assigns an IP address to the server based on information on the subnet assigned to the network sub group.

Figure 40:
FIG. 40 is a diagram of an example of IP address management data stored as information on IP addresses assigned to servers.

FIG. 40 is a diagram of an example of IP address management data 1040 stored as information on IP addresses assigned to servers. The IP address management data 1040 is stored in the system resource DB 26 by the system resource manager 21.

The IP address management data 1040 contains information on IP address and assignment destination. The IP address is information on an IP address assigned to the server. The assignment destination is information for identifying the server to which the IP address is assigned.

Subsequently, the network RM 24 assigns a load distribution group including a representative IP address to the network group corresponding to the server group to which the server is added, based on the load distribution group data 840 shown in FIG. 28 and the network group data 850 shown in FIG. 29. At this state, a load distribution function of the load balancer is stopped.

Thereafter, the user installs the software such as OS to be installed in the server to the storage sub group associated with the server to be added to the server group. The storage sub group is configured by using a SAN technology.

After the installation is finished, the software sub RM 53 creates the software image constituted of a group of the software such as OS, device driver, and application software, in cooperation with the software RM 23 and the software RM agent 113*a*, and stores the software image created in the domain resource DB 55.

Specifically, the software RM 23 reads the middleware cooperation IF data 330 shown in FIG. 7, and the software RM agent 113*a* transmits a command necessary to be executed before acquiring the software image to the AP managing unit 116*a* that is a function unit realized by the middleware.

In other words, the software RM agent 113*a* transmits a command for stopping the function of the AP managing unit 116*a* and stops the function of the AP managing unit 116*a*. The software sub RM 53 shutdowns the system of the server. The software sub RM 53 performs a network boot of the server using tentative OS stored in the domain resource DB 55 of the domain management server 50 of the server.

Thereafter, the software sub RM 53 creates the software image of the software installed in the server started. The software RM 23 registers information on the software image on the system resource DB 26 as software image management data 1050 described below.

FIG. 41 is a diagram of an example of the software image management data 1050 stored as information on software images. The software image management data 1050 contains information on software image name, format, OS property, and software name.

The software image name is a name of a software image. The format is information that indicates whether a software image is created in archive format or in patch format. The OS property is information that indicates whether a software image is an OS software image. The software name is a name of software for which a software image is created.

Moreover, the software sub RM 53 creates a software distribution image to be distributed to other servers, based on the software image created. Specifically, the software sub RM 53 creates a software distribution image in which software images are grouped of a plurality of software installed in a storage for the first server.

The system resource manager 21 stores information on the software distribution image in the system resource DB 26 as software distribution image management data 1060 described below.

FIG. 42 is a diagram of an example of the software distribution image management data 1060 stored as information on software distribution images. The software distribution image management data 1060 contains information on software distribution image name, version, server architecture name, and software image/snapshot name.

The software distribution image name is a name of a software distribution image. The version is a version of the software distribution image. The server architecture name is identification information for identifying a CPU architecture of the server to which the software distribution image is distributed. The software image/snapshot name is identification information for identifying a software image or a snapshot included in the software distribution image.

The snapshot is a software image of the software installed in the server at a specific timing. The system resource manager 21 registers information on the snapshot on the system resource DB 26 as snapshot management data 1070 described below.

FIG. 43 is a diagram of an example of the snapshot management data 1070 stored as information on snapshots. The snapshot management data 1070 contains information on snapshot name and software image name. The snapshot name is a name of a snapshot. The software image name is identification information for identifying a software image included in the snapshot.

Thereafter, the software RM 23 reads the middleware cooperation IF data 330 shown in FIG. 7. The software RM agent 113a transmits a command necessary to be executed after acquiring the software image to the AP managing unit 116a that is a function unit realized by the middleware.

Specifically, the software RM agent 113a transmits a command for starting the AP managing unit 116a on standby and starts the AP managing unit 116a. The network RM 24 connects the server to a VLAN by performing a setting of the VLAN to a switch, activates a load distribution function of the load balancer, and assigns the server as a target server to which a load is distributed.

Thereafter, the system resource manager 21 reads the middleware cooperation IF data 330 shown in FIG. 7, and transmits a command necessary to be executed after creating the server group to the AP-management control unit 27 that is a function unit realized by the middleware.

Specifically, the system resource manager 21 transmits a command that enables a recognition of an addition of the server group to the AP-management control unit 27. The AP-management control unit 27 performs an installation and a setting of application programs to the server in cooperation with the AP managing unit 116a, and sets the server to be in a state available for a task.

Referring back to FIG. 3, the system resource manager 21 performs a processing of adding the second server and subsequent servers to the server group (step S106). The processing performed at step S106 is described in detail below.

FIG. 44 is a flowchart of a processing procedure of a processing of adding a server to a server group. As shown in FIG. 44, the system resource manager 21 receives information on the server and the server group when a user specifies the server and the server group on which the server is registered by operating the operation management client 10 (step S401).

The system resource manager 21 registers the server on the server group (step S402). Subsequently, the system resource manager 21 reads the management target server data 700 shown in FIG. 20 and the software distribution image management data 1060 shown in FIG. 42, and checks whether the server architecture of the server is enabled for an installation of the software image (step S403). When the server architecture of the server is not enabled for the installation of the software image (NO at step S403), the processing of adding the server to the server group ends.

When the server architecture of the server is enabled for the installation of the software image (YES at step S403), the storage RM 25 performs a processing of setting the storage to the server, in the same manner for setting the storage to the first server (step S404). Specifically, the storage RM 25 performs a processing of setting the logical volume described in connection with FIGS. 30 and 35 to the server.

Subsequently, the network RM 24 performs a network boot of the server registered on the server group using a tentative OS in the same manner for setting the network to the first server, and performs a setting of the network to the server (step S405).

Thereafter, the software sub RM 53 expands the software distribution image created from the software installed in the first server onto the storage sub group associated with the second server, and reboots the server using expanded software (step S406).

When the software distribution image is expanded onto the storage sub group associated with the server, the software RM 23 stores information on the software distribution image distributed in the system resource DB 26.

FIG. 45 is a diagram of an example of distribution management data 1080 stored as information on distribution statuses of software distribution images. The distribution management data 1080 contains information on server name, storage sub group name, software distribution image name, version, and status.

The server name is information for identifying a server to which a storage sub group is assigned. The storage sub group name is information for identifying a storage sub group onto which a software distribution image is expanded. The software distribution image name is information for identifying a software distribution image that is expanded onto a storage sub group. The version is information on version of a distributed software distribution image. The status is information that indicates a status of distributing a software distribution image.

Referring back to FIG. 44, the system resource manager 21 performs a processing of moving a mode of the second server to be in an operation mode in cooperation with the network RM 24 and the AP-management control unit 27 (step S407).

Specifically, the network RM 24 assigns an IP address to the second server based on information on the subnet to which the first server belongs, at the timing of rebooting the server. The information on the IP address assigned to the second server is stored in the IP address management data 1040 shown in FIG. 40 by the system resource manager 21.

Subsequently, the network RM 24 connects the server to VLAN by performing a setting of VLAN to a switch, and registers the server on the load balancer as a target server to which a load is distributed.

Thereafter, the system resource manager 21 transmits a command for causing the AP-management control unit 27 to recognize that the server is added to the server group to the AP-management control unit 27. The AP-management control unit 27 performs an installation or a setting of the application to the server in cooperation with the AP managing unit 116*a*, and sets the server to be in a state available for the task.

When adding the third server or subsequent servers to the server group, the processing of adding the server described in connection with FIG. 44 is repeated.

Figure 46:
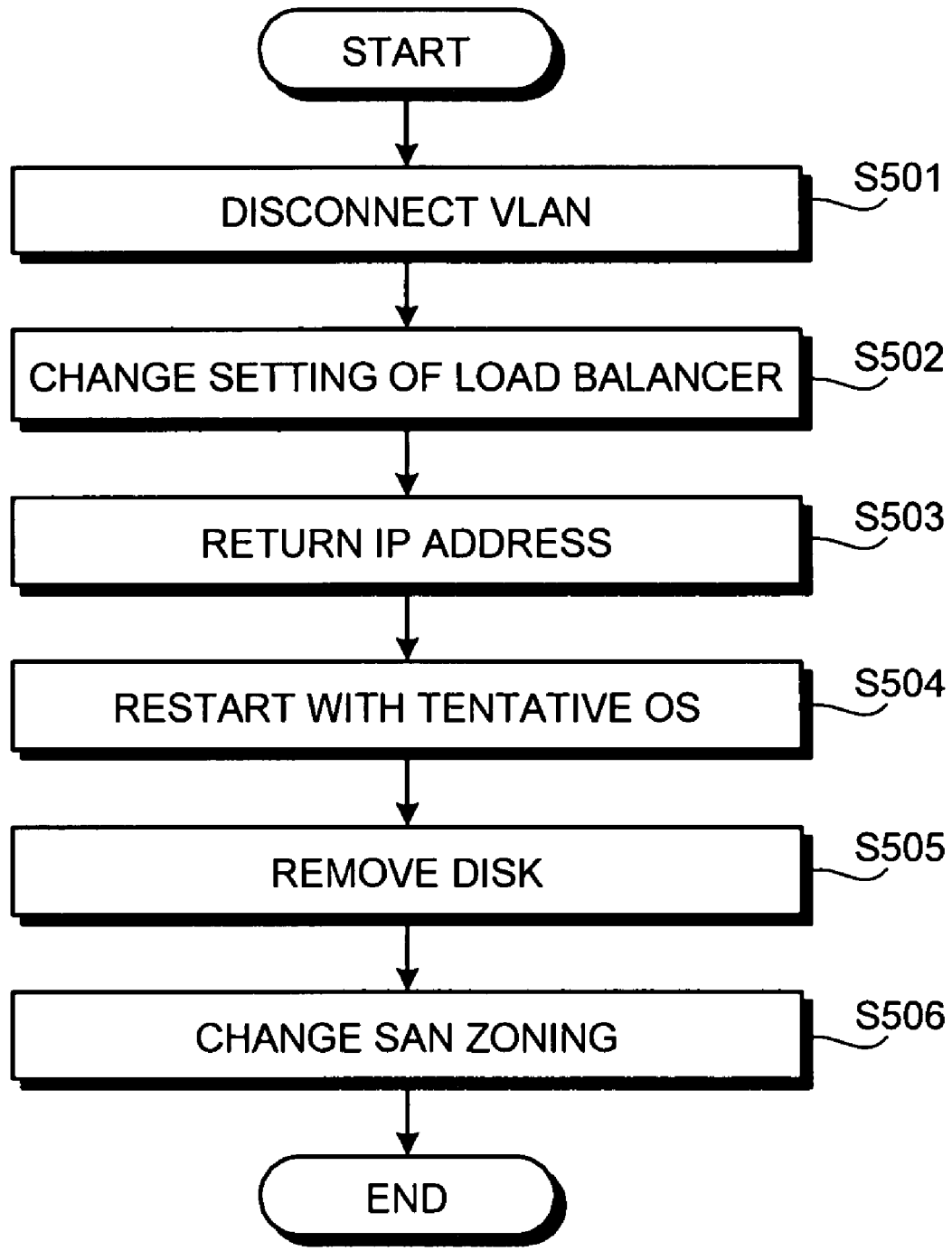
FIG. 46 is a flowchart of a processing procedure of a server delete processing of deleting a server from a server group.

FIG. 46 is a flowchart of a processing procedure of a server delete processing of deleting a server from a server group.

As shown in FIG. 46, the network RM 24 disconnects VLAN set to the server, in cooperation with the network sub RM 54 (step S501). The network RM 24 changes a setting of the load balancer and removes the server from the target servers to which a load is distributed, in cooperation with the network sub RM 54 (step S502).

Subsequently, the network RM 24 returns the IP address assigned to the server (step S503). The software sub RM 53 reboots the server by a network boot, using the tentative OS stored in the domain resource DB 55 of the domain management server 50 (step S504).

The storage RM 25 removes a disk assigned to the server to be deleted from the server group (step S505). The storage RM 25 changes a SAN zoning that is a logical connection relation between the servers and the storages set to the servers, and sets a SAN zoning between the servers excluding the server and the storages (step S506).

Figure 47:
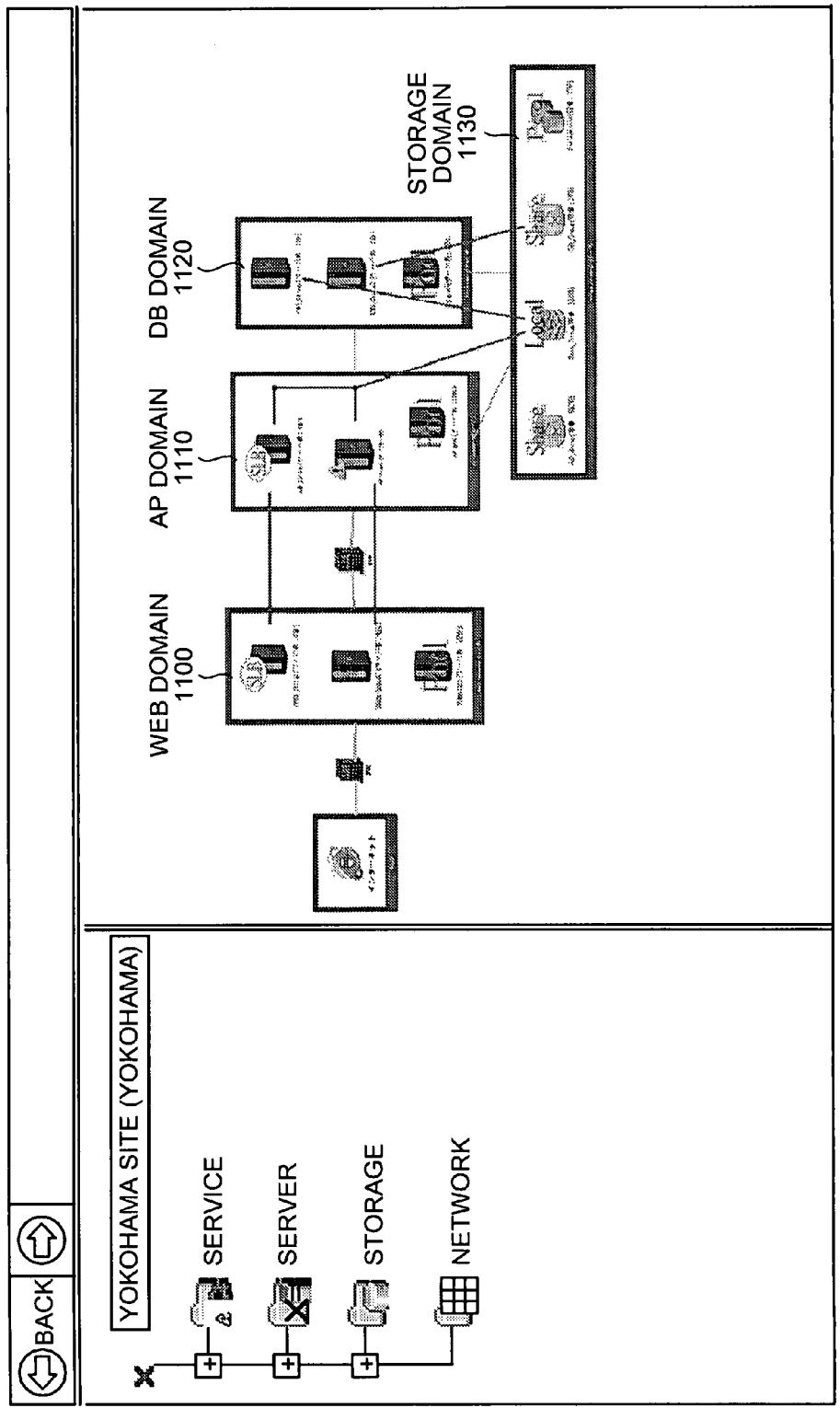
FIG. 47 is a view of an example of a resource-layout output screen on which layouts of resources to be managed are displayed.

Next, various screens are explained, which are displayed on the operation management client 10 through a resource assignment management processing by the system resource manager 21. FIG. 47 is a view of an example of a resource-layout output screen 1090 on which layouts of resources to be managed are displayed.

As shown in FIG. 47, the resource-layout output screen 1090 is configured so that a user can view immediately how various severs that belong to a web domain 1100, an AP domain 1110, and a DB domain 1120 and the storages that belong to a storage domain 1130 are connected from one another.

Figure 48:
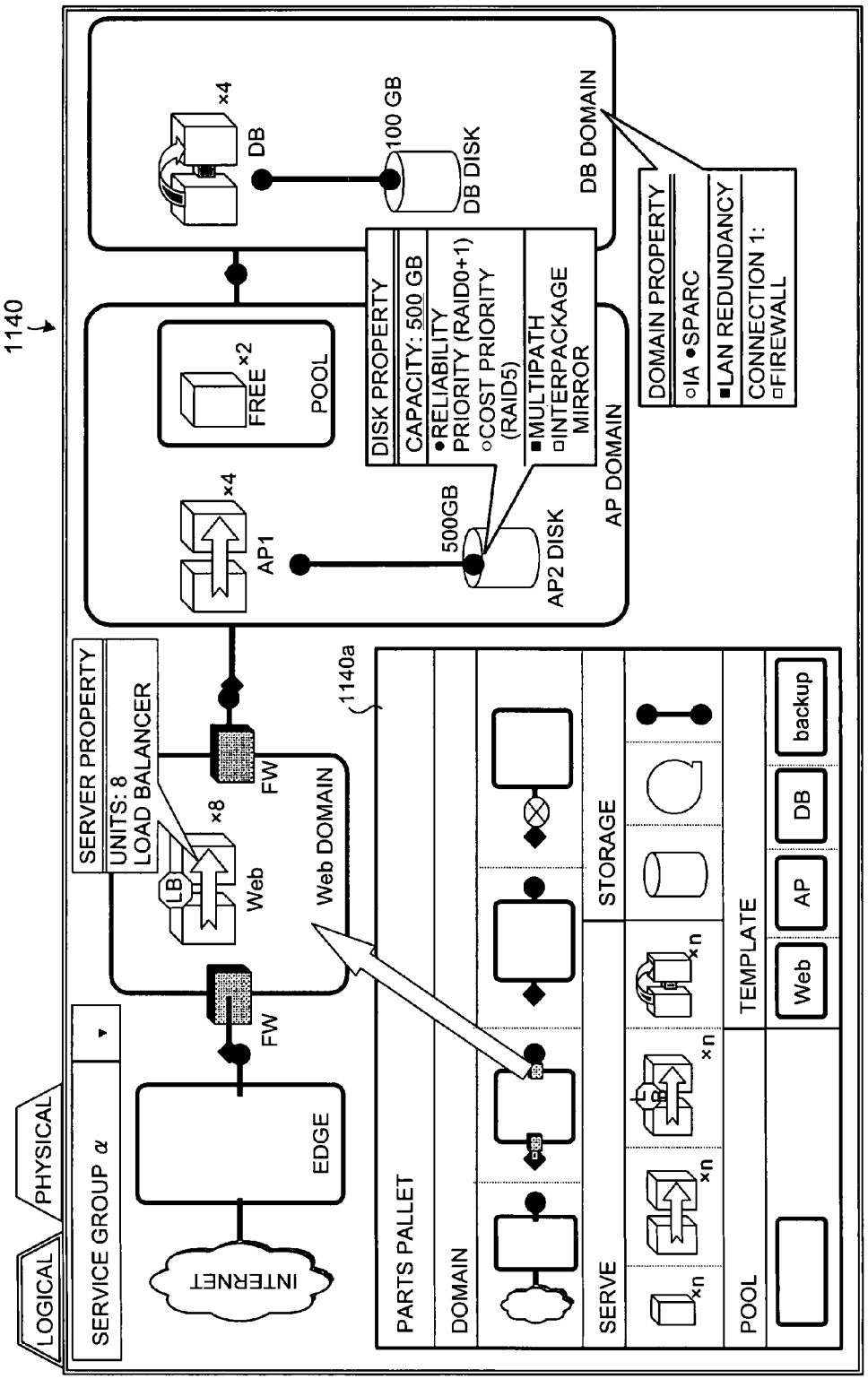
FIG. 48 is a view of an example of a resource-layout setting screen to which settings on layouts of resources are input by a user.

FIG. 48 is a view of an example of a resource-layout setting screen 1140 to which settings on layouts of resources are input by a user. A parts pallet 1140*a* is displayed on the resource-layout setting screen 1140 so that a layout of various resources can be determined by a user by allocating various icons on the parts pallet, such as domain, server, and storage, by operating a mouse and the like.

Figure 49:
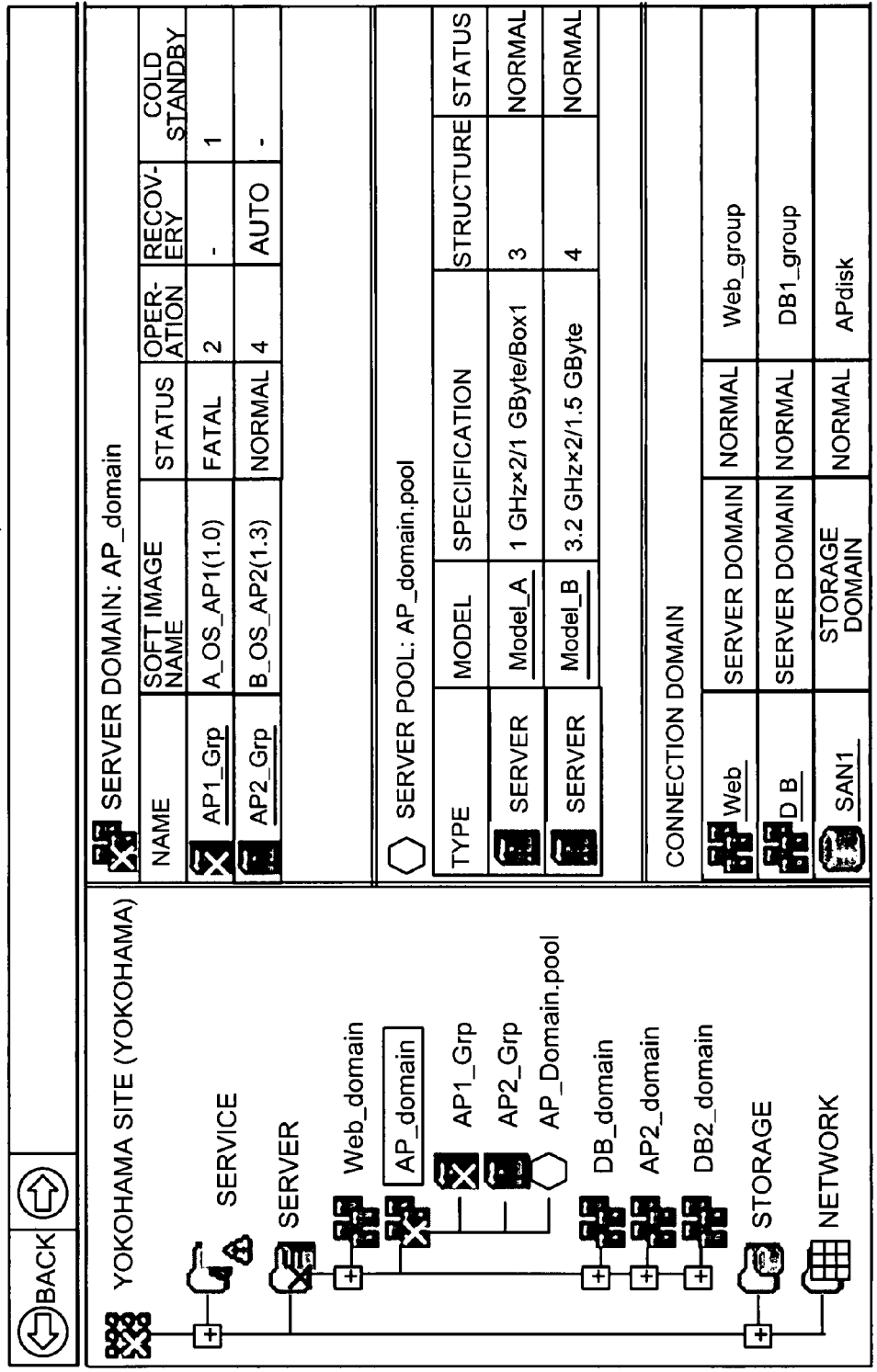
FIG. 49 is a view of an example of a server-group list screen on which a list of server groups that belong to server domains are displayed.

FIG. 49 is a view of an example of a server-group list screen 1150 on which a list of server groups that belong to server domains are displayed. When the server domain is specified by a user by operating a mouse and the like, a list of the server groups that belong to the server domain and a list of the pooled servers capable of being added to the server group are displayed on the server-group list screen 1150.

Figure 50:
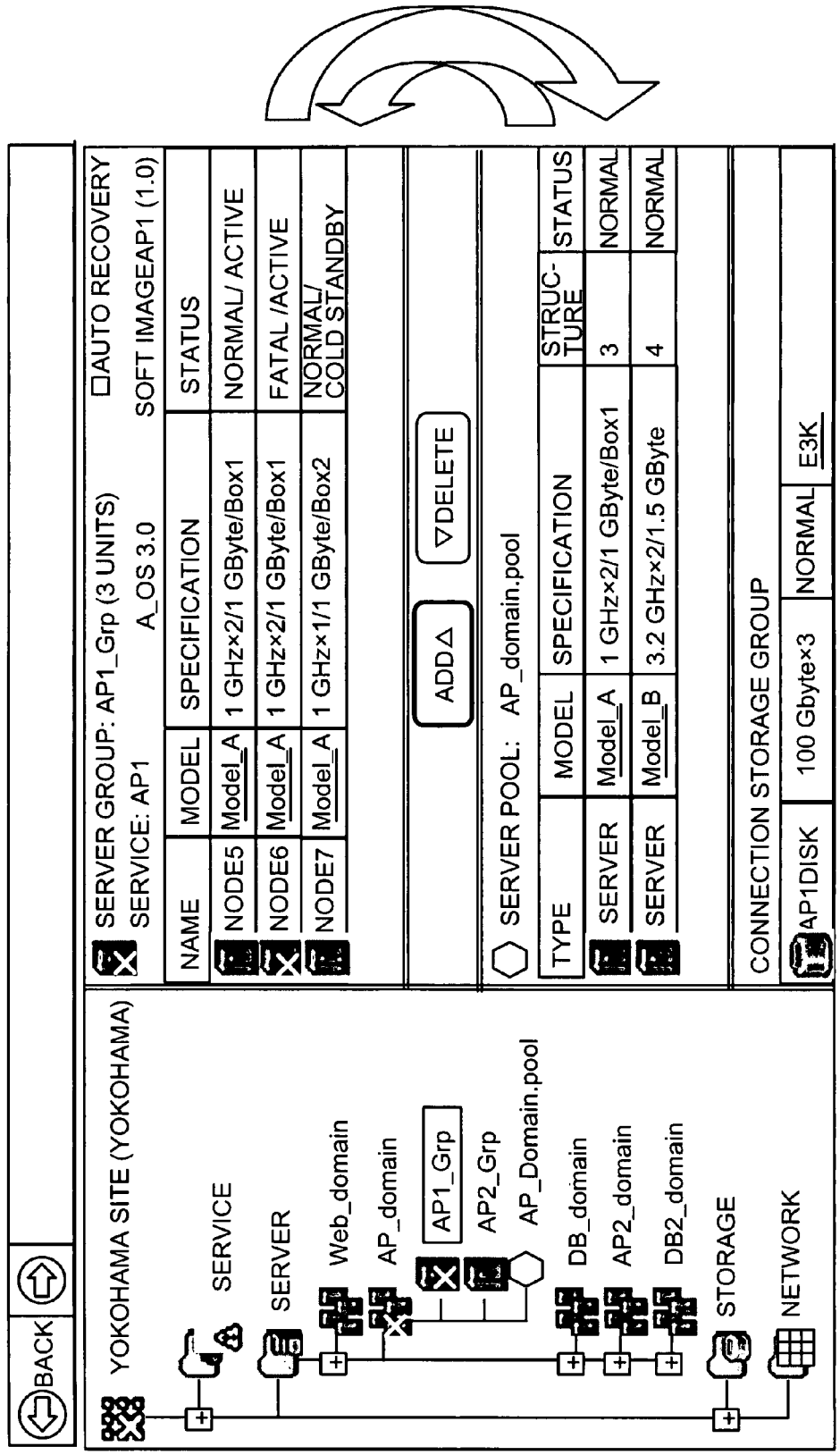
FIG. 50 is a view of an example of a server list screen on which a list of servers that belong to server groups are displayed.

FIG. 50 is a view of an example of a server list screen 1160 on which a list of servers that belong to server groups are displayed. When the server group is specified by a user by operating a mouse and the like, a list of the servers that belong to the server group and a list of the pooled servers capable of being added to the server group are displayed on the server list screen 1160.

In addition, when the pooled server is specified on the server list screen 1160 by a user by operating a mouse and the like, and if an add button is clicked, an execution request for an processing of adding the specified server to the server group is transmitted to the system resource manager 21 and the processing of adding the server is performed.

When the server that belongs to the sever group is specified on the server list screen 1160 by a user by operating a mouse and the like, and if a delete button is clicked, a deletion request for an processing of deleting the specified server from the server group is transmitted to the system resource manager 21 and the processing of deleting the server is performed.

Figure 51:
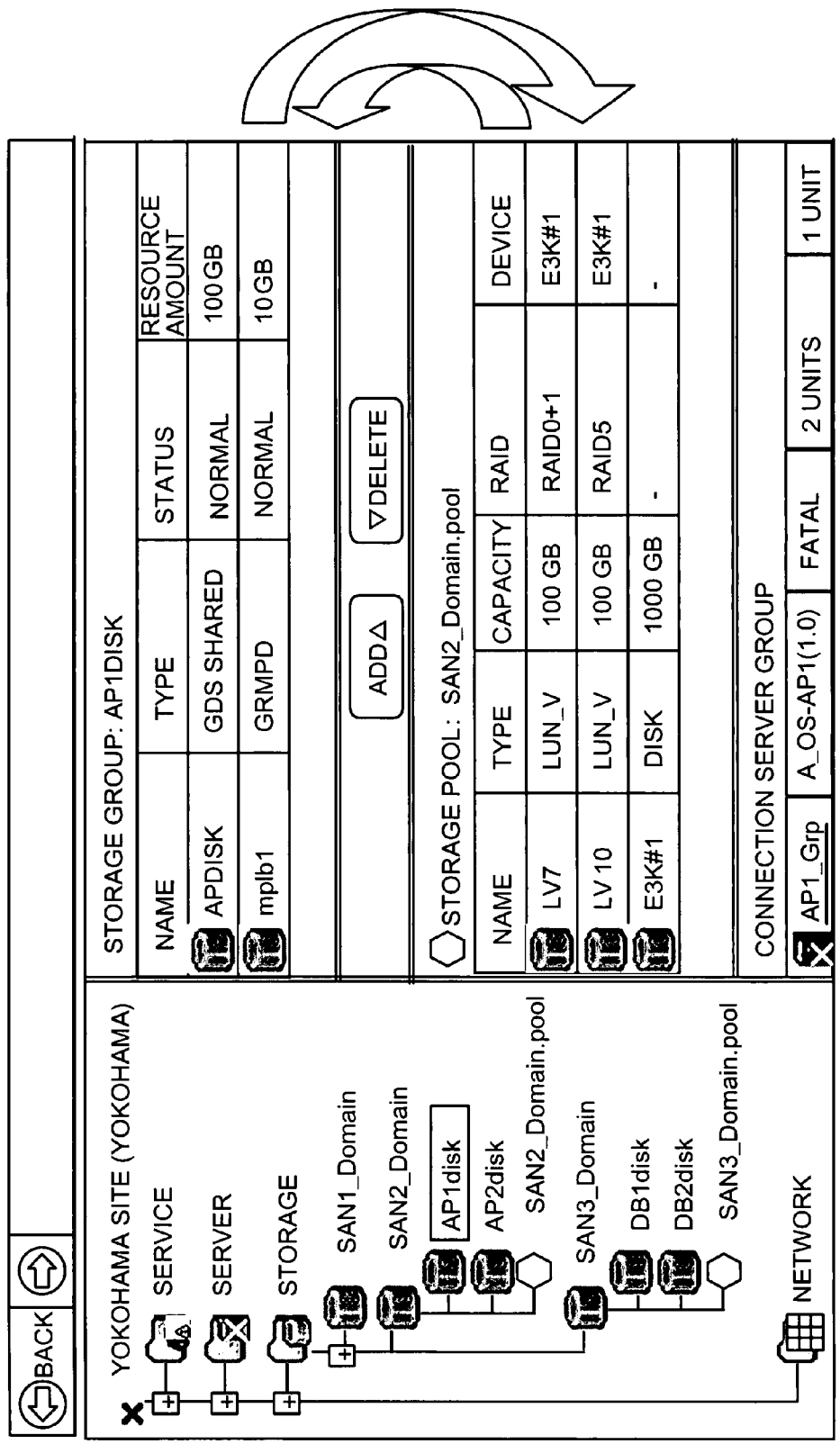
FIG. 51 is a view of an example of a storage list screen on which a list of storages that belong to storage groups are displayed.

FIG. 51 is a view of an example of a storage list screen 1170 on which a list of storages that belong to storage groups are displayed. Similarly to the server list screen 1160 shown in FIG. 50, when the storage group is specified on the storage list screen 1170 by a user by operating a mouse and the like, a list of the storages that belong to the storage group and a list of the pooled storages capable of being added to the storage group are displayed on the storage list screen 1170.

When the pooled storage is specified on the storage list screen 1170 by a user by operating a mouse and the like, and if an add button is clicked, an execution request for an processing of adding the specified storage to the storage group is transmitted to the system resource manager 21 and the processing of adding the storage is performed.

When the storage that belongs to the storage group is specified on the storage list screen 1170 by a user by operating a mouse and the like, and if a delete button is clicked, a deletion request for an processing of deleting the specified storage from the storage group is transmitted to the system resource manager 21 and the processing of deleting the storage is performed.

The various processings described in the above embodiment can be realized by causing a computer to execute a pre-prepared programs. An example of the computer that executes an operation management program is explained below in connection with FIGS. 52 to 54.

Figure 52:
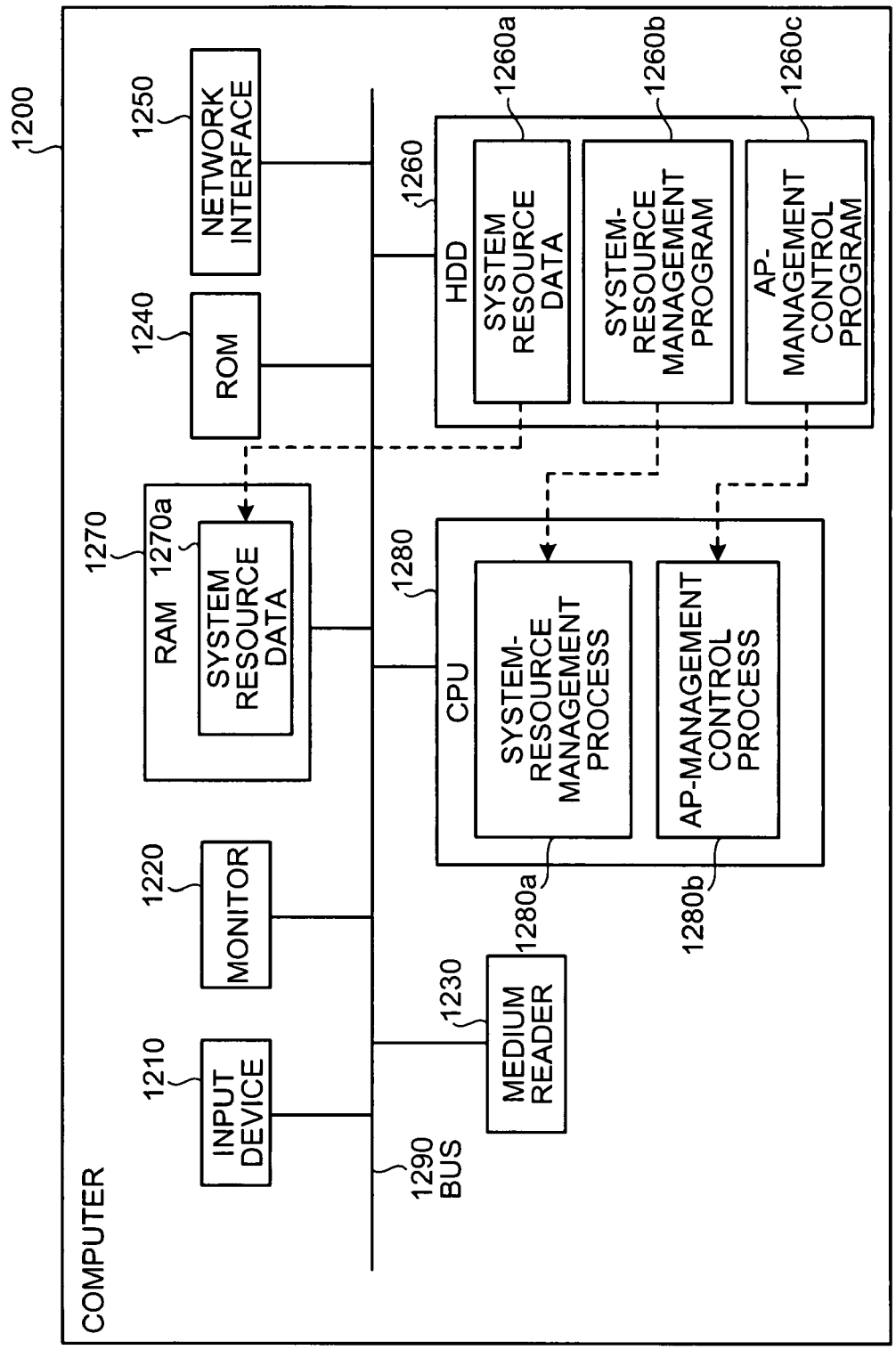
FIG. 52 is a block diagram of a hardware configuration of a computer used as a site management server shown in FIG. 2.

FIG. 52 is a block diagram of a hardware configuration of a computer 1200 used as the site management server 20 shown in FIG. 2. The computer 1200 is configured by connecting, via a bus 1290, an input device 1210 that receives data input from a user, a monitor 1220, a medium reader 1230 that reads out programs from a recording medium in which various programs are recorded, a ROM (read only memory) 1240, a network interface 1250 that transmits and receives data between other computers via a network, an HDD (hard disk drive) 1260, a RAM (random access memory) 1270, and a CPU (central processing unit) 1280 from one another.

The HDD 1260 stores therein programs that realize functions same as those of the site management server 20, that is, a system-resource management program 1260*b* and an AP-management control program 1260*c* shown in FIG. 52.

The system-resource management program 1260*b* and the AP-management control program 1260*c* can be integrated or be distributed for a recording as appropriate.

When the CPU 1280 reads and executes the system-resource management program 1260*b* and the AP-management control program 1260*c* from the HDD 1260, they work as functions of a system-resource management process 1280*a* and an AP-management control process 1280*b*.

The system-resource management process 1280*a* corresponds to the system resource manager 21, the server RM 22, the software RM 23, the network RM 24, and the storage RM 25 shown in FIG. 2. The AP-management control process 1280*b* corresponds to the AP-management control unit 27 shown in FIG. 2.

The HDD 1260 also stores therein system resource data 1260*a*. The system resource data 1260*a* corresponds to various data stored in the system resource DB 26 shown in FIG. 2.

The CPU 1280 stores therein various data related to a management of the resource as the system resource data 1260a, reads the system resource data 1260a from the HDD 1260 to store read data in the RAM 1270, and performs various data processings based on system resource data 1270a stored in the RAM 1270.

Figure 53:
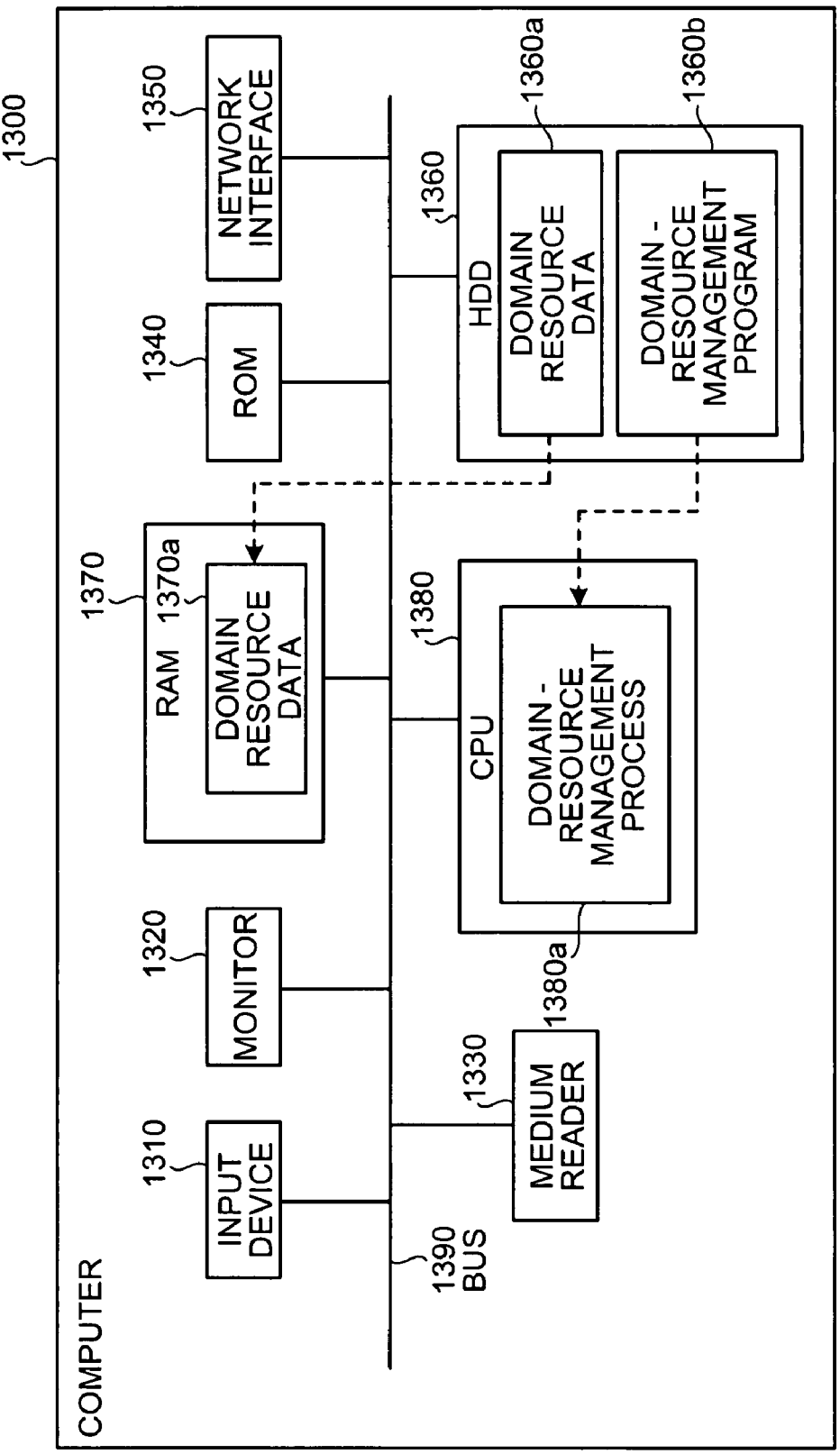
FIG. 53 is a block diagram of a hardware configuration of another computer used as a domain management server shown in FIG. 2.

FIG. 53 is a block diagram of a hardware configuration of a computer 1300 used as the domain management server 60 shown in FIG. 2. The computer 1300 is configured by connecting, via a bus 1390, an input device 1310 that receives data input from a user, a monitor 1320, a medium reader 1330 that reads out programs from a recording medium in which various programs are recorded, a ROM 1340, a network interface 1350 that transmits and receives data between other computers via a network, an HDD 1360, a RAM 1370, and a CPU 1380 from one another.

The HDD 1360 stores therein programs that realize functions same as those of the domain management servers 50 and 60, that is, a domain-resource management program 1360b shown in FIG. 53. The domain-resource management program 1360b can be integrated or be distributed for a recording as appropriate.

When the CPU 1380 reads and executes the domain-resource management program 1360b from the HDD 1360, it works as a function of a domain-resource management process 1380a.

The domain-resource management process 1380a corresponds to the system resource domain manager 51, the server sub RM 52, the software sub RM 53, and the network sub RM 54 shown in FIG. 2.

The HDD 1360 also stores therein domain resource data 1360a. The domain resource data 1360a corresponds to various data stored in the domain resource DB 55 shown in FIG. 2.

The CPU 1380 stores therein various data related to a management of the resource in the domain as the domain resource data 1360a, reads the domain resource data 1360a from the HDD 1360 to store read data to the RAM 1370, and performs various data processings based on the domain resource data 1370a stored in the RAM 1370.

Figure 54:
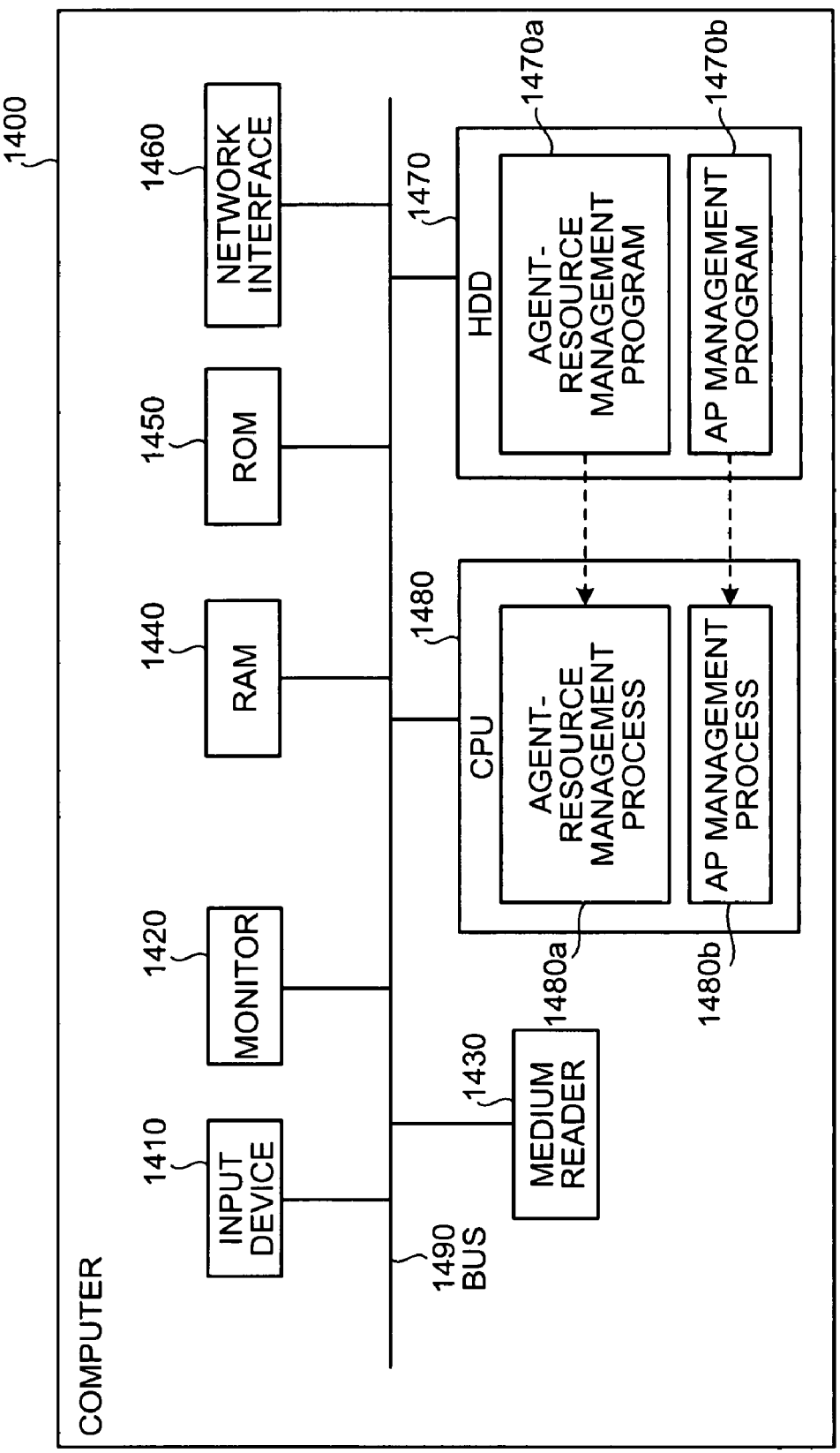
FIG. 54 is a block diagram of a hardware configuration of another computer used as a server shown in FIG. 2.

FIG. 54 is a block diagram of a hardware configuration of a computer 1400 used as the server 110a shown in FIG. 2. The computer 1400 is configured by connecting, via a bus 1490, an input device 1410 that receives a data input from a user, a monitor 1420, a medium reader 1430 that reads out programs from a recording medium in which various programs are recorded, a RAM 1440, a ROM 1450, a network interface 1460 that transmits and receives data between other computers via a network, an HDD 1470, and a CPU 1480 from one another.

The HDD 1470 stores therein programs that realize same functions as those of the server 110a, that is, an agent-resource management program 1470a and an AP management program 1470b shown in FIG. 54. The agent-resource management program 1470a and the AP management program 1470b can be integrated or be distributed for a recording as appropriate.

When the CPU 1480 reads and executes the agent-resource management program 1470a and the AP management program 1470b from the HDD 1460, they work as functions of an agent-resource management process 1480a and an AP management process 1480b.

The agent-resource management process 1480a corresponds to the resource manager agent 111a, the server RM agent 112a, the software RM agent 113a, the network RM agent 114a, and the storage RM agent 115a shown in FIG. 2. The AP management process 1480b corresponds to the AP managing unit 116a shown in FIG. 2.

The system-resource management processing program 1260b, the AP-management control program 1260c, the domain-resource management program 1360b, the agent-resource management program 1470a, and the AP management program 1470b are not necessary to be recorded in advance in the HDD 1260, the HDD 1360, or the HDD 1470.

For example, it is acceptable to store each of programs in a removable physical medium, such as a flexible disk (FD), CD-ROM, an MO disk, a DVD disk, an optical magnetic disk, or an IC card, to be inserted to the computer 1200, 1300, or 1400. It is also acceptable to store the programs in a built-in physical medium, such as an HDD installed in a computer or attached to an outside of the computer, or in other computers (or a server) connected to the computer 1200, 1300, or 1400 via a public line, the Internet, a LAN, or a WAN. In this case, it is possible for the computer 1200, 1300, or 1400 to read each of the programs and to execute the programs.

As described above, according to the embodiment, the system resource manager 21 registers server domains as a group of servers having a uniform physical wire connection, and the software RM 23 and the software sub RM 53 execute, in cooperation with each other, an install of a software used by a server that belongs to the registered server domain. This makes it possible to reduce a work of setting servers performed by an administrator.

Moreover, according to the embodiment, the network RM 24 and the network sub RM 53 cooperates to execute settings on a network of a server that uses a software, the software RM 23 and the software sub RM 53 execute, in cooperation with each other, an install of a software that is used by the server, that is, settings on network is performed. This makes it possible to more reduce the work of setting servers performed by the administrator.

Furthermore, according to the embodiment, after the software used by a server is installed, the software RM 23 and the software sub RM 53 execute, in cooperation with each other, an install of another software different from the installed software, which makes it possible to easily perform a change of information processing executed by the server without placing a burden on the administrator.

Moreover, according to the embodiment, the software RM 23 and the software sub RM 53 install, in cooperation with each other, a software used by a server to a RAID device that is connected to the server via SAN and is accessed by the server. This makes it possible to employ a flexible configuration such as sharing a RAID device with a plurality of servers.

Furthermore, according to the embodiment, the system resource manager 21 registers the server domain as a server domain constituted with a plurality of server groups to which the server belongs, and the software RM 23 and the software sub RM 53 execute, in cooperation with each other, an install of a software used by a server that belongs to each of the server groups of the registered server domain. This makes it possible to easily perform setting for causing the server that belongs to each of the server groups to perform different information processing, without placing a burden on the administrator.

While the embodiment of the present invention is explained so far, the present invention can be implemented with various different embodiments other than the above-described embodiment within a scope of technical ideas described in the claims.

For example, according to the embodiment, a case is depicted in which a software necessary for a server to be added to a server group is installed in a storage connected via SAN, and a server is booted from the storage. However, it is acceptable that the necessary software is installed in a built-in disk that each server includes, and the server is booted from the built-in disk.

Of the processes described in the embodiment, all or part of the processes explained as being performed automatically can be performed manually. Similarly, all or part of the processes explained as being performed manually can be performed automatically by a known method.

The processing procedures, the control procedures, specific names, various data, and information including parameters described in the embodiment or shown in the drawings can be changed as required unless otherwise specified.

The constituent elements of the device shown in the drawings are merely conceptual, and need not be physically configured as illustrated. The constituent elements, as a whole or in part, can be separated or integrated either functionally or physically based on various types of loads or use conditions.

The process functions performed by the device are entirely or partially realized by the CPU or computer programs that are analyzed and executed by the CPU, or realized as hardware by wired logic.

As described above, according to one aspect of the present invention, a resource domain as a group of resources having a uniform physical wire connection is registered, and an install of a software used by a resource that belongs to the registered resource domain is executed, which makes it possible to obtain an effect of reducing a work of an administrator of the information processing system for setting resources.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A computer-readable, non-transitory medium that stores therein a computer program for managing an operation of resources constituting an information processing system, the computer program causing a computer to execute:
    registering a resource domain as a group of resources having a uniform physical wire connection;
    setting, for a resource group, a storage domain to which a plurality of storages belong;
    first obtaining WWPN data stored in a switch being located between a storage that belongs to the storage domain and a resource that belongs to the resource domain, the WWPN data being world wide port name data;
    second obtaining WWPN data stored in each of the resources that belong to the resource domain;
    third obtaining WWPN data stored in each of the storages that belong to the storage domain;
    identifying devices connected and physically wired to the switch based on the WWPN data obtained at the first obtaining, the second obtaining and the third obtaining;
    checking, depending on whether each of the storages that belong to the storage domain is physically wired to a corresponding resource that belongs to the resource domain or not, whether connections between each of the resources that belong to the resource domain and a corresponding storage that belongs to the storage domain are uniform; and
    executing an install of a software, from a storage that belongs to the storage domain, used by a resource that belongs to the resource domain registered at the registering.

2. The computer-readable, non-transitory medium according to claim 1, wherein the executing includes:
    performing a setting of a network of the resource that uses the software, and
    executing the install of the software used by the resource.

3. The computer-readable, non-transitory medium according to claim 1, further causing the computer to execute installing, after the software is installed at the executing, other software that is different from installed software.

4. The computer-readable, non-transitory medium according to claim 1, wherein the executing includes installing the software used by the resource in a storage device that is connected to the resource via a network and is accessed by the resource.

5. The computer-readable, non-transitory medium according to claim 1, wherein:
    the registering includes registering the resource domain as a resource domain constituted with a plurality of groups to which the resource belongs, and
    the executing includes executing an install of a software used by a resource that belongs to each of the groups of the resource domain registered at the registering.

6. A method of managing an operation of resources constituting an information processing system, the method comprising:
    registering a resource domain as a group of resources having a uniform physical wire connection;
    setting, for a resource group a storage domain to which a plurality of storages belong;
    first obtaining WWPN data stored in a switch being located between a storage that belongs to the storage domain and a resource that belongs to the resource domain, the WWPN data being world wide port name data;
    second obtaining WWPN data stored in each of the resources that belong to the resource domain;
    third obtaining WWPN data stored in each of the storages that belong to the storage domain;
    identifying devices connected and physically wired to the switch based on the WWPN data obtained at the first obtaining, the second obtaining and the third obtaining;
    checking, depending on whether each of the storages that belong to the storage domain is physically wired to a corresponding resource that belongs to the resource domain or not, whether connections between each of the resources that belong to the resource domain and a corresponding storage that belongs to the storage domain are uniform; and
    executing an install of a software, from a storage that belongs to the storage domain, used by a resource that belongs to the resource domain registered at the registering.

7. The method according to claim 6, wherein the executing includes:
    performing a setting of a network of the resource that uses the software, and
    executing the install of the software used by the resource.

8. The method according to claim 6, further comprising installing, after the software is installed at the executing, software that is different from installed software.

9. The method according to claim 6, wherein the executing includes installing the software used by the resource in a storage device that is connected to the resource via a network and is accessed by the resource.

10. The method according to claim 6, wherein:
    the registering includes registering the resource domain as a resource domain constituted with a plurality of groups to which the resource belongs, and the executing includes executing an install of a software used by a resource that belongs to each of the groups of the resource domain registered at the registering.

11. An apparatus for managing an operation of resources constituting an information processing system, the apparatus comprising:
a processor; and
a memory, wherein the processor executes:
registering a resource domain as a group of resources having a uniform physical wire connection;
setting, for a resource group, a storage domain to which a plurality of storages belong;
first obtaining WWPN data stored in a switch being located between a storage that belongs to the storage domain and a resource that belongs to the resource domain, the WWPN data being world wide port name data;
second obtaining WWPN data stored in each of the resources that belong to the resource domain;
third obtaining WWPN data stored in each of the storages that belong to the storage domain;
identifying devices connected and physically wired to the switch based on the WWPN data obtained at the first obtaining, the second obtaining and the third obtaining;
checking, depending on whether each of the storages that belong to the storage domain is physically wired to a corresponding resource that belongs to the resource domain or not, whether connections between each of the resources that belong to the resource domain and a corresponding storage that belongs to the storage domain are uniform; and
executing an install of a software, from a storage that belongs to the storage domain, used by a resource that belongs to the resource domain registered at the registering.

12. The apparatus according to claim 11, wherein the executing includes performing a setting of a network of the resource that uses the software, and executing the install of the software used by the resource.

13. The apparatus according to claim 11, further comprising installing, after the software is installed at the executing, other software that is different from installed software.

14. The apparatus according to claim 11, wherein the executing includes installing the software used by the resource in a storage device that is connected to the resource via a network and is accessed by the resource.

15. The apparatus according to claim 11, wherein:
the registering includes registering the resource domain as a resource domain constituted with a plurality of groups to which the resource belongs, and
the executing includes executing an install of a software used by a resource that belongs to each of the groups of the resource domain registered at the registering.

* * * * *